US012124109B2

(12) United States Patent
 Chen

(10) Patent No.: US 12,124,109 B2
(45) Date of Patent: Oct. 22, 2024

(54) CAMERA OPTICAL LENS

(71) Applicant: AAC Optics (Suzhou) Co., Ltd., Suzhou (CN)

(72) Inventor: Jiekang Chen, Shenzhen (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 469 days.

(21) Appl. No.: 17/543,746

(22) Filed: Dec. 7, 2021

(65) Prior Publication Data

US 2022/0206256 A1 Jun. 30, 2022

(30) Foreign Application Priority Data

Dec. 30, 2020 (CN) .......................... 202011628500.1

(51) Int. Cl.
*G02B 13/00* (2006.01)
*G02B 9/64* (2006.01)

(52) U.S. Cl.
CPC ........... *G02B 9/64* (2013.01); *G02B 13/0045* (2013.01)

(58) Field of Classification Search
CPC .. G02B 13/0045; G02B 9/64; G02B 15/1465; G02B 15/1455
See application file for complete search history.

(56) References Cited

U.S. PATENT DOCUMENTS

2020/0012078 A1* 1/2020 Kuo ....................... G02B 13/18
2020/0400922 A1* 12/2020 Hirano ................... H04N 23/55
2021/0096330 A1* 4/2021 Huang ............... G02B 13/0045

FOREIGN PATENT DOCUMENTS

CN 111552059 A * 8/2020

OTHER PUBLICATIONS

Melles Griot Practical Application of Light: Catalogue, "Lens Shape"; "Aberration Balancing"; 1999, pp. 1.17, 1.27-1.28 (Year: 1999) (Year: 1999).*
Frank L. Pedrotti, "Geometrical Optics", 2007, Introduction to Optics, Pearson Prentice-Hall, pp. 16-49 (Year: 2007) (Year: 2007).*

* cited by examiner

*Primary Examiner* — Wyatt A Stoffa
*Assistant Examiner* — Samanvitha Sridhar
(74) *Attorney, Agent, or Firm* — W&G Law Group

(57) ABSTRACT

The present invention discloses a camera optical lens including, from an object side to an image side in sequence, a first lens having a negative refractive power, a second lens, a third lens, a fourth lens, a fifth lens, a sixth lens, a seventh lens, and an eighth lens. The camera optical lens satisfies the following conditions: $100.00° \leq FOV \leq 135.00°$, $-8.00 \leq f3/f4 \leq -0.50$, and $0.60 \leq d8/d10 \leq 4.50$. The camera optical lens according to the present invention has excellent optical characteristics, such as large aperture, wide-angle, and ultra-thin.

19 Claims, 9 Drawing Sheets

CAMERA OPTICAL LENS

FIELD OF THE PRESENT INVENTION

The present invention relates to the field of optical lens, and more particularly, to a camera optical lens suitable for handheld terminal devices, such as smart phones and digital cameras, monitors or PC lenses.

DESCRIPTION OF RELATED ART

In recent years, with the rise of various smart devices, the demand for miniaturized camera optics has been increasing, and the pixel size of photosensitive devices has shrunk, coupled with the development trend of electronic products with good functions, thin and portable appearance, Therefore, miniaturized imaging optical lenses with good image quality have become the mainstream in the current market. In order to obtain better imaging quality, a multi-piece lens structure is often used. Moreover, with the development of technology and the increase of diversified needs of users, as the pixel area of the photosensitive device continues to shrink and the system's requirements for image quality continue to increase, the eight-piece lenses structure gradually appears in the lens design. There is an urgent need for a wide-angle imaging lens with excellent optical characteristics, small size, and fully corrected aberrations.

SUMMARY

In the present invention, a cameral optical lens has excellent optical characteristics with large aperture, wide angle and ultra-thin.

According to one aspect of the present invention, a camera optical lens with six-piece lenses comprises, from an object side to an image side in sequence denotes a first lens having a negative refractive power, a second lens, a third lens, a fourth lens, a fifth lens, a sixth lens, a seventh lens, and an eighth lens. The camera optical lens satisfies the following conditions: $100.00° \leq FOV \leq 135.00°$, $-8.00 \leq f3/f4 \leq -0.50$, and $0.60 \leq d8/d10 \leq 4.50$. FOV denotes a field of view of the camera optical lens in a diagonal direction, f3 denotes a focal length of the third lens, f4 denotes a focal length of the fourth lens, d8 denotes an on-axis distance from an image side surface of the fourth lens to an object side surface of the fifth lens, and d10 denotes an on-axis distance from an image side surface of the fifth lens to an object side surface of the sixth lens.

As an improvement, the camera optical lens satisfies the following condition: $2.00 \leq (R9+R10)/(R9-R10) \leq 9.00$. R9 denotes a central curvature radius of the object side surface of the fifth lens, and R10 denotes a central curvature radius of the image side surface of the fifth lens.

As an improvement, the first lens has an image side surface being concave in a paraxial region. The camera optical lens further satisfies the following conditions: $-4.29 \leq f1/f \leq -1.02$, $0.35 \leq (R1+R2)/(R1-R2) \leq 1.65$, and $0.02 \leq d1/TTL \leq 0.41$. f1 denotes a focal length of the first lens, f denotes a focal length of the camera optical lens, R1 denotes a central curvature radius of the object side surface of the first lens, R2 denotes a central curvature radius of the image side surface of the first lens, d1 denotes an on-axis thickness of the first lens, and TTL denotes a total optical length from an object side surface of the first lens of the camera optical lens to an image surface of the camera optical lens along an optical axis.

As an improvement, the camera optical lens further satisfies the following conditions: $-2.68 \leq f1/f \leq -1.28$, $0.55 \leq (R1+R2)/(R1-R2) \leq 1.32$, and $0.04 \leq d1/TTL \leq 0.33$.

As an improvement, the second lens has an object side surface being convex in a paraxial region, the second lens has a positive refractive power. The camera optical lens further satisfies the following conditions: $0.69 \leq f2/f \leq 3.57$, $-2.34 \leq (R3+R4)/(R3-R4) \leq -0.15$, and $0.03 \leq d3/TTL \leq 0.17$. f denotes a focal length of the optical camera lens, f2 denotes a focal length of the second lens, R3 denotes a central curvature radius of the object side surface of the second lens, R4 denotes a central curvature radius of an image side surface of the second lens, d3 denotes an on-axis thickness of the second lens, and TTL denotes a total optical length from an object side surface of the first lens of the camera optical lens to an image surface of the camera optical lens along an optical axis.

As an improvement, the camera optical lens further satisfies the following conditions: $1.11 \leq f2/f \leq 2.85$, $-1.46 \leq (R3+R4)/(R3-R4) \leq -0.19$, and $0.056 \leq d3/TTL \leq 0.13$.

As an improvement, the third lens has an object side surface being concave in a paraxial region, and an image side surface being convex in the paraxial region. The camera optical lens further satisfies the following conditions: $-92.83 \leq f3/f \leq 972.61$, $-229.57 \leq (R5+R6)/(R5-R6) \leq 1.78$, and $0.02 \leq d5/TTL \leq 0.06$. f denotes a focal length of the optical camera lens, R5 denotes a central curvature radius of the object side surface of the third lens, R6 denotes a central curvature radius of the image side surface of the third lens, d5 denotes an on-axis thickness of the third lens, and TTL denotes a total optical length from an object side surface of the first lens of the camera optical lens to an image surface of the camera optical lens along an optical axis.

As an improvement, the camera optical lens further satisfies the following conditions: $-58.02 \leq f3/f \leq 778.09$, $-143.48 \leq (R5+R6)/(R5-R6) \leq 1.43$, and $0.026 \leq d5/TTL \leq 0.05$.

As an improvement, the fourth lens has an object side surface being concave in a paraxial region, the image side surface of the fourth lens is convex in the paraxial region. The camera optical lens further satisfies the following conditions: $-304.79 \leq f4/f \leq 8.71$, $-17.41 \leq (R7+R8)/(R7-R8) \leq 1.91$, and $0.02 \leq d7/TTL \leq 0.06$. f denotes a focal length of the optical camera lens, R7 denotes a central curvature radius of the object side surface of the fourth lens, R8 denotes a central curvature radius of the image side surface of the fourth lens, d7 denotes an on-axis thickness of the fourth lens, and TTL denotes a total optical length from an object side surface of the first lens of the camera optical lens to an image surface of the camera optical lens along an optical axis.

As an improvement, the camera optical lens further satisfies the following conditions: $-190.49 \leq f4/f \leq 6.97$, $-10.88 \leq (R7+R8)/(R7-R8) \leq 1.52$, and $0.026 \leq d7/TTL \leq 0.05$.

As an improvement, the object side surface of the fifth lens is convex in a paraxial region and the image side surface of the fifth lens is concave in the paraxial region, the fifth lens has a negative refractive power. The camera optical lens further satisfies the following conditions: $-23.83 \leq f5/f \leq -3.03$ and $0.01 \leq d9/TTL \leq 0.08$. f denotes a focal length of the camera optical lens, f5 denotes a focal length of the fifth lens, d9 denotes an on-axis thickness of the fifth lens, and TTL denotes a total optical length from an object side surface of the first lens of the camera optical lens to an image surface of the camera optical lens along an optical axis.

As an improvement, the camera optical lens further satisfies the following conditions: $-14.90 \leq f5/f \leq -3.78$ and $0.02 \leq d9/TTL \leq 0.06$.

As an improvement, the object side surface of the sixth lens is convex in a paraxial region, the sixth lens has a positive refractive power, the camera optical lens further satisfies the following conditions: $4.57 \leq f6/f \leq 16.51$, $-11.02 \leq (R11+R12)/(R11-R12) \leq -0.26$, and $0.03 \leq d11/TTL \leq 0.14$. f denotes a focal length of the camera optical lens, f6 denotes a focal length of the sixth lens, R11 denotes a central curvature radius of the object side surface of the sixth lens, R12 denotes a central curvature radius of an image side surface of the sixth lens, d11 denotes an on-axis thickness of the sixth lens, and TTL denotes a total optical length from an object side surface of the first lens of the camera optical lens to an image surface of the camera optical lens along an optical axis.

As an improvement, the camera optical lens further satisfies the following conditions: $7.31 \leq f6/f \leq 13.21$, $-6.89 \leq (R11+R12)/(R11-R12) \leq -0.32$, and $0.05 \leq d11/TTL \leq 0.11$.

As an improvement, the seventh lens has an image side surface being convex in a paraxial region, the seventh lens has a positive refractive power. The camera optical lens further satisfies the following conditions: $0.35 \leq f7/f \leq 1.92$, $0.39 \leq (R13+R14)/(R13-R14) \leq 1.51$, and $0.03 \leq d13/TTL \leq 0.16$. f denotes a focal length of the camera optical lens, f7 denotes a focal length of the seventh lens, R13 denotes a central curvature radius of an object side surface of the seventh lens, R14 denotes a central curvature radius of the image side surface of the seventh lens, d13 denotes an on-axis thickness of the seventh lens, and TTL denotes a total optical length from an object side surface of the first lens of the camera optical lens to an image surface of the camera optical lens along an optical axis.

As an improvement, the camera optical lens further satisfies the following conditions: $0.57 \leq f7/f \leq 1.54$, $0.63 \leq (R13+R14)/(R13-R14) \leq 1.20$, and $0.06 \leq d13/TTL \leq 0.13$.

As an improvement, the eighth lens has an object side surface being convex in a paraxial region and an image side surface being concave in the paraxial region, the eighth lens has a negative refractive power. The camera optical lens further satisfies the following conditions: $-2.70 \leq f8/f \leq -0.46$, $0.55 \leq (R15+R16)/(R15-R16) \leq 2.73$, and $0.02 \leq d15/TTL \leq 0.12$. f denotes a focal length of the camera optical lens, f8 denotes a focal length of the eighth lens, R15 denotes a central curvature radius of the object side surface of the eighth lens, R16 denotes a central curvature radius of the image side surface of the eighth lens, d15 denotes an on-axis thickness of the eighth lens, and TTL denotes a total optical length from an object side surface of the first lens of the camera optical lens to an image surface of the camera optical lens along an optical axis.

As an improvement, the camera optical lens further satisfies the following conditions: $-1.69 \leq f8/f \leq -0.57$, $0.88 \leq (R15+R16)/(R15-R16) \leq 2.18$, and $0.03 \leq d15/TTL \leq 0.10$.

As an improvement, the camera optical lens further satisfies the following condition: $TTL/IH \leq 3.14$. IH denotes an image height of the camera optical lens, and TTL denotes a total optical length from an object side surface of the first lens of the camera optical lens to an image surface of the camera optical lens along an optical axis.

As an improvement, an FNO of the camera optical lens is less than or equal to 1.86. FNO denotes a ratio of an effective focal length of the camera optical lens to an entrance pupil diameter.

BRIEF DESCRIPTION OF THE DRAWINGS

In order to explain the technical solutions in the embodiments of the present invention more clearly, the following will briefly introduce the drawings that need to be used in the description of the embodiments. Obviously, the drawings in the following description are only some embodiments of the present invention. For those of ordinary skill in the art, without creative work, other drawings can be obtained based on these drawings, among which.

DETAILED DESCRIPTION OF THE EXEMPLARY EMBODIMENTS

In order to make the objects, technical solutions, and advantages of the present invention more apparent, the embodiments of the present invention will be described in detail below. However, it will be apparent to the one skilled in the art that, in the various embodiments of the present invention, a number of technical details are presented in order to provide the reader with a better understanding of the invention. However, the technical solutions claimed in the present invention can be implemented without these technical details and various changes and modifications based on the following embodiments.

Embodiment 1

Figure 1:
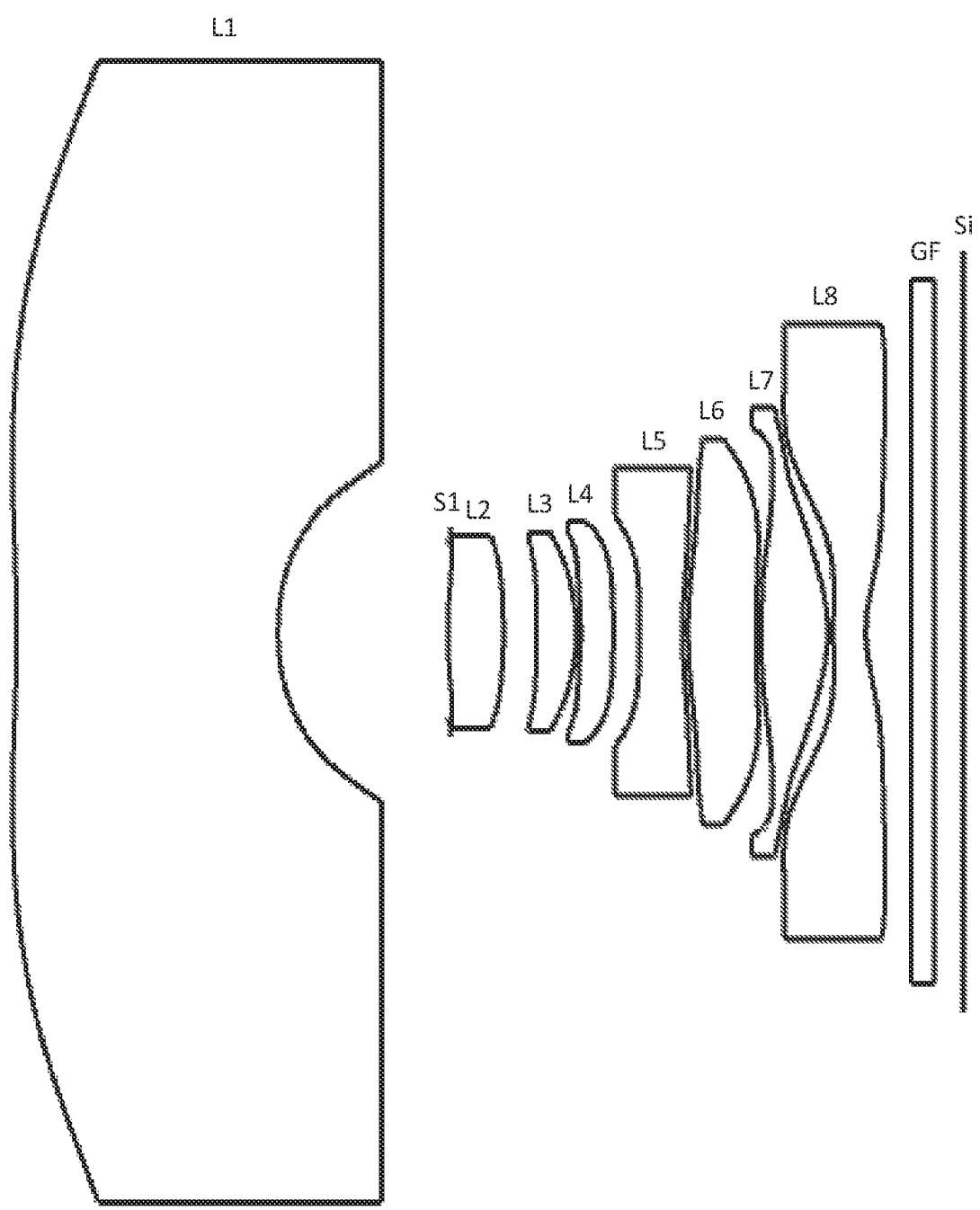
FIG. 1 is a schematic diagram of a structure of a camera optical lens in accordance with Embodiment 1 of the present invention.

As referring to the accompanying drawings, the present invention provides a camera optical lens 10. FIG. 1 shows the camera optical lens 10 according to embodiment 1 of the present invention. The camera optical lens 10 comprises eight-piece lenses. Specifically, from an object side to an image side, the camera optical lens 10 comprises in sequence: a first lens L1, an aperture S1, a second lens L2, a third lens L3, a fourth lens L4, a fifth lens L5, a sixth lens L6, a seventh lens L7 and an eighth lens L8. Optical elements like optical filter GF can be arranged between the eighth lens L8 and an image surface Si.

The first lens L1 is made of plastic material, the second lens L2 is made of plastic material, the third lens L3 is made of plastic material, the fourth lens L4 is made of plastic material, the fifth lens L5 is made of plastic material, the sixth lens L6 is made of plastic material, the seventh lens L7 is made of plastic material, and the eighth lens L8 is made of plastic material. In other optional embodiments, each lens may also be made of other materials, such as glasses.

In the present embodiment, a field of view of the camera optical lens 10 in a diagonal direction is defined as FOV, the camera optical lens 10 satisfies the following condition: $100.00° \leq FOV \leq 135.00°$. The range of the FOV is specified. When the camera optical lens 10 satisfies the above condition, the camera optical lens 10 has a wide-angle performance.

A focal length of the third lens L3 is defined as f3, a focal length of the fourth lens L4 is defined as f4. The camera optical lens 10 meets the following condition: $-8.00 \leq f3/f4 \leq -0.50$. A ratio of the focal length f3 of the third lens L3 to a focal length f4 of the fourth lens L4 is specified. When the above condition is satisfied, the camera optical lens 10 has a higher imaging quality and a lower sensitivity as the focal length reasonably distributed.

An on-axis distance from an image side surface of the fourth lens L4 to an object side surface of the fifth lens L5 is defined as d8; an on-axis distance from an image side surface of the fifth lens L5 to an object side surface of the sixth lens L6 is defined as d10. The camera optical lens 10 meets the following condition: $0.60 \leq d8/d10 \leq 4.50$, which specifies a ratio of the on-axis distance d8 from the image side surface of the fourth lens L4 to the object side surface of the fifth lens L5 to the on-axis distance d10 from the image side surface of the fifth lens L5 to the object side surface of the sixth lens L6. When the condition is satisfied, it is beneficial for reducing a total optical length so that the camera optical lens may be ultra-thin.

A central curvature radius of the object side surface of the fifth lens L5 is defined as R9, a central curvature radius of the image side surface of the fifth lens L5 is defined as R10. The camera optical lens 10 meets the following condition: $2.00 \leq (R9+R10)/(R9-R10) \leq 9.00$. The condition defines a shape of the fifth lens L5. When the condition is satisfied, a light deflection can be alleviated while the light entry into the lens and an aberration is effectively reduced.

In the present embodiment, an object side surface of the first lens L1 is concave in a paraxial region, an image side surface of the first lens L1 is concave in the paraxial region, and the first lens L1 has a negative refractive power. In other optional embodiments, the object side surface and the image side surface of the first lens L1 can also be arranged as other concave side surface or convex side surface, such as, convex object side surface and convex image side surface and so on.

A focal length of the camera optical lens 10 is defined as f, and a focal length of the first lens L1 is defined as f1. The camera optical lens 10 further satisfies the following condition: $-4.29 \leq f1/f \leq -1.02$. It specifies a ratio of the focal length f1 of the first lens L1 to the focal length f of the camera optical lens 10. When the condition is satisfied, the first lens L1 has a proper negative refractive power, so that the aberration of the camera optical lens can be reduced and the camera optical lens has the ultra-thin and wide-angle effect. Preferably, the following condition shall be satisfied, $-2.68 \leq f1/f \leq -1.28$.

A central curvature radius of the object side surface of the first lens L1 is defined as R1, and a central curvature radius of the image side surface of the first lens L1 is defined as R2. The camera optical lens 10 further satisfies the following condition: $0.35 \leq (R1+R2)/(R1-R2) \leq 1.65$. This condition reasonably controls a shape of the first lens L1, so that the first lens L1 can effectively correct a spherical aberration of the camera optical lens 10. Preferably, the following condition shall be satisfied, $0.55 \leq (R1+R2)/(R1-R2) \leq 1.32$.

An on-axis thickness of the first lens L1 is defined as d1. A total optical length from the object side surface of the first lens L1 to the image surface Si of the camera optical lens 10 along an optical axis is defined as TTL. The camera optical lens 10 further satisfies the following condition: $0.02 \leq d1/TTL \leq 0.41$. When the value is within this range, it is beneficial for producing the ultra-thin camera optical lens. Preferably, the following condition shall be satisfied, $0.04 \leq d1/TTL \leq 0.33$.

In the present embodiment, an object side surface of the second lens L2 is convex in the paraxial region, an image side surface of the second lens L2 is convex in the paraxial region, and the second lens L2 has a positive refractive power. In other optional embodiments, the object side surface and the image side surface of the second lens L2 can also be arranged as other concave side surface or convex side surface, such as, concave object side surface and concave image side surface and so on. The second lens L2 may have a negative refractive power.

The focal length of the camera optical lens 10 is defined as f, and a focal length of the second lens L2 is defined as f2. The camera optical lens 10 further satisfies the following condition: $0.69 \leq (f2/f \leq 3.57$. It is beneficial for correcting the aberration of the camera optical lens 10 by controlling the positive refractive power of the second lens L2 being within reasonable range. Preferably, the following condition shall be satisfied, $1.11 \leq f2/f \leq 2.85$.

A central curvature radius of the object side surface of the second lens L2 is defined as R3, and a central curvature radius of the image side surface of the second lens L2 is defined as R4. The camera optical lens 10 further satisfies the following condition: $-2.34 \leq (R3+R4)/(R3-R4) \leq -0.15$, which specifies a shape of the second lens L2. When the condition is satisfied, as the camera optical lens 10 develops toward the ultra-thin and wide-angle effect, it is beneficial for correcting an on-axis chromatic aberration. Preferably, the following condition shall be satisfied, $-1.46 \leq (R3+R4)/(R3-R4) \leq -0.19$.

An on-axis thickness of the second lens L2 is defined as d3. The total optical length from the object side surface of the first lens L1 to the image surface Si of the camera optical lens 10 along the optical axis is defined as TTL. The camera optical lens 10 further satisfies the following condition: $0.03 \leq d3/TTL \leq 0.17$. When the value is within this range, it is beneficial for producing the ultra-thin camera optical lens. Preferably, the following condition shall be satisfied, $0.05 \leq d3/TTL \leq 0.13$.

In the present embodiment, an object side surface of the third lens L3 is concave in the paraxial region, an image side surface of the third lens L3 is convex in the paraxial region, and the third lens L3 has a positive refractive power. In other optional embodiments, the object side surface and the image side surface of the third lens L3 can also be arranged as other concave side surface or convex side surface, such as, convex object side surface and concave image side surface and so on. The third lens L3 may have a negative refractive power.

The focal length of the camera optical lens 10 is defined as f, and a focal length of the third lens L3 is defined as f3. The camera optical lens 10 further satisfies the following condition: $-92.83 \leq f3/f \leq 972.61$. By a reasonable distribution of the refractive power, which makes the camera optical lens 10 has the higher imaging quality and the lower sensitivity. Preferably, the following condition shall be satisfied, $-58.02 \leq f3/f \leq 778.09$.

A central curvature radius of the object side surface of the third lens L3 is defined as R5, and a central curvature radius of the image side surface of the third lens L3 is defined as R6. The camera optical lens 10 further satisfies the following condition: $-229.57 \leq (R5+R6)/(R5-R6) \leq 1.78$, which specifies a shape of the third lens L3. It is beneficial for molding the third lens L3. When the condition is satisfied, a light deflection can be alleviated while the light passing through the lens and the aberration can be reduced effectively. Preferably, the following condition shall be satisfied, $-143.48 \leq (R5+R6)/(R5-R6) \leq 1.43$.

An on-axis thickness of the third lens L3 is defined as d5. The total optical length from the object side surface of the first lens L1 to the image surface Si of the camera optical lens 10 along the optical axis is defined as TTL. The camera optical lens 10 further satisfies the following condition: $0.02 \leq d5/TTL \leq 0.06$, which benefits for realizing the ultra-thin effect. Preferably, the following condition shall be satisfied, $0.026 \leq d5/TTL \leq 0.05$.

In the present embodiment, an object side surface of the fourth lens L4 is concave in the paraxial region, the image side surface of the fourth lens L4 is convex in the paraxial region, and the fourth lens L4 has a negative refractive power. In other optional embodiments, the object side surface and the image side surface of the fourth lens L4 can also be arranged as other convex side surface or concave side surface, such as, convex object side surface and concave image side surface and so on. The fourth lens may have a positive refractive power.

The focal length of the camera optical lens 10 is defined as f, and a focal length of the fourth lens L4 is defined as f4. The camera optical lens 10 further satisfies the following condition: $-304.79 \leq f4/f \leq 8.71$. It is beneficial for realizing the excellent imaging quality and the lower sensitivity by controlling the refractive power being within reasonable range. Preferably, the following condition shall be satisfied, $-190.49 \leq f4/f \leq 6.97$.

A curvature radius of the object side surface of the fourth lens L4 is defined as R7, and a central curvature radius of the image side surface of the fourth lens L4 is defined as R8. The camera optical lens further satisfies the following condition: $-17.41 \leq (R7+R8)/(R7-R8) \leq 1.91$, which specifies a shape of the fourth lens L4. When the condition is satisfied, as the development of the ultra-thin and wide-angle lenses, it is beneficial for solving the problems, such as correcting an off-axis aberration. Preferably, the following condition shall be satisfied, $-10.88 \leq (R7+R8)/(R7-R8) \leq 1.52$.

An on-axis thickness of the fourth lens L4 is defined as d7. The total optical length from the object side surface of the first lens L1 to the image surface Si of the camera optical lens 10 along the optical axis is defined as TTL. The camera optical lens 10 further satisfies the following condition: $0.02 \leq d7/TTL \leq 0.06$, which is beneficial for realizing the ultra-thin effect. Preferably, the following condition shall be satisfied, $0.02 \leq d7/TTL \leq 0.05$.

In the present embodiment, the object side surface of the fifth lens L5 is convex in the paraxial region, the image side surface of the fifth lens L5 is concave in the paraxial region, and the fifth lens L5 has a negative refractive power. In other optional embodiments, the object side surface and the image side surface of the fifth lens L5 can also be arranged as other convex side surface or concave side surface, such as, concave object side surface and convex image side surface and so on. The fifth lens L5 may have a positive refractive power.

The focal length of the camera optical lens 10 is defined as f, and a focal length of the fifth lens L5 is defined as f5. The camera optical lens 10 further satisfies the following condition: $-23.83 \leq f5/f \leq -3.03$. When the value is within this range, a light angle of the camera optical lens 10 can be smoothed effectively and a sensitivity of the tolerance can be reduced. Preferably, the following condition shall be satisfied, $-14.90 \leq f5/f \leq -3.78$.

An on-axis thickness of the fifth lens L5 is defined as d9. The total optical length from the object side surface of the first lens L1 to the image surface Si of the camera optical lens 10 along the optical axis is defined as TTL. The camera optical lens 10 further satisfies the following condition: $0.01 \leq d9/TTL \leq 0.08$. When the condition is satisfied, it is beneficial for realizing the ultra-thin effect. Preferably, the following condition shall be satisfied, $0.02 \leq d9/TTL \leq 0.06$.

In the present embodiment, an object side surface of the sixth lens L6 is convex in the paraxial region, an image side surface of the sixth lens L6 is concave in the paraxial region, and the sixth lens L6 has a positive refractive power. In other optional embodiments, the object side surface and the image side surface of the sixth lens L6 can be arranged as other convex side surface or concave side surface, such as, concave object side surface and convex image side surface and so on. The sixth lens L6 may have a negative refractive power.

The focal length of the camera optical lens 10 is defined as f, and a focal length of the sixth lens L6 is defined as f6. The camera optical lens further satisfies the following condition: $4.57 \leq f6/f \leq 16.51$. It is beneficial for realizing the excellent imaging quality and the lower sensitivity by controlling the refractive power being within reasonable range. Preferably, the following condition shall be satisfied, $7.31 \leq f6/f \leq 13.21$.

A central curvature radius of the object side surface of the sixth lens L6 is defined as R11, and a central curvature radius of the image side surface of the sixth lens L6 is defined as R12. The camera optical lens further satisfies the following condition: $-11.02 \leq (R11+R12)/(R11-R12) \leq -0.26$, which specifies a shape of the sixth lens L6. When the condition is satisfied, as the development of the ultra-thin and wide-angle lenses, it benefits for correcting the off-axis aberration. Preferably, the following condition shall be satisfied, $-6.89 \leq (R11+R12)/(R11-R12) \leq -0.32$.

An on-axis thickness of the sixth lens L6 is defined as d11. The total optical length from the object side surface of the first lens L1 to the image surface Si of the camera optical lens 10 along the optical axis is defined as TTL. The camera optical lens further satisfies the following condition: $0.03 \leq d11/TTL \leq 0.14$, which is beneficial for realizing the ultra-thin effect. Preferably, the following condition shall be satisfied, $0.05 \leq d11/TTL \leq 0.11$.

In the present embodiment, an object side surface of the seventh lens L7 is convex in the paraxial region, an image side surface of the seventh lens L7 is convex in the paraxial region, and the seventh lens L7 has a positive refractive power. In other optional embodiments, the object side surface and the image side surface of the seventh lens L7 can be arranged as other convex side surface or concave side surface, such as, concave object side surface and concave image side surface and so on. The seventh lens L7 may have a negative refractive power.

The focal length of the camera optical lens 10 is defined as f, and a focal length of the seventh lens L7 is defined as f7. The camera optical lens 10 further satisfies the following condition: $0.35 \leq f7/f \leq 1.92$. It is beneficial for realizing the better imaging quality and the lower sensitivity by controlling the refractive power being within reasonable range. Preferably, the following condition shall be satisfied, $0.57 \leq f7/f \leq 1.54$.

A central curvature radius of the object side surface of the seventh lens L7 is defined as R13, and a central curvature radius of the image side surface of the seventh lens L7 is defined as R14. The camera optical lens 10 further satisfies the following condition: 0.39≤(R13+R14)/(R13−R14)≤1.51, which specifies a shape of the seventh lens L7. When the condition is satisfied, as the development of the ultra-thin and wide-angle lenses, it is beneficial for correcting the off-axis aberration. Preferably, the following condition shall be satisfied, 0.63≤(R13+R14)/(R13−R14)≤1.20.

An on-axis thickness of the seventh lens L7 is defined as d13. The total optical length from the object side surface of the first lens L1 to the image surface Si of the camera optical lens 10 along the optical axis is defined as TTL. The camera optical lens further satisfies the following condition: 0.03≤d13/TTL≤0.16, which is beneficial for realizing the ultra-thin effect. Preferably, the following condition shall be satisfied, 0.066≤d13/TTL≤0.13.

In the present embodiment, an object side surface of the eighth lens L8 is convex in the paraxial region, an image side surface of the eighth lens L8 is concave in the paraxial region, and the eighth lens L8 has negative refractive power. In other optional embodiments, the object side surface and the image side surface of the eighth lens L8 can be arranged as other convex side surface or concave side surface, such as, concave object side surface and convex image side surface and so on. The eighth lens L8 may have a positive refractive power.

The focal length of the camera optical lens 10 is defined as f, and a focal length of the eighth lens L8 is defined as f8. The camera optical lens 10 further satisfies the following condition: −2.70≤f8/f≤−0.46. It is beneficial for realizing the better imaging quality and the lower sensitivity by controlling the refractive power being within reasonable range. Preferably, the following condition shall be satisfied, −1.69≤f8/f≤−0.57.

A central curvature radius of the object side surface of the eighth lens L8 is defined as R15, and a central curvature radius of the image side surface of the eighth lens L8 is defined as R16. The camera optical lens 10 further satisfies the following condition: 0.55≤(R15+R16)/(R15−R16)≤2.73, which specifies a shape of the eighth lens L8. When the condition is satisfied, as the development of the ultra-thin and wide-angle lenses, it is beneficial for correcting the off-axis aberration. Preferably, the following condition shall be satisfied, 0.88≤(R15+R16)/(R15−R16)≤2.18.

An on-axis thickness of the eighth lens L8 is defined as d15. The total optical length from the object side surface of the first lens L1 to the image surface Si of the camera optical lens 10 along the optical axis is defined as TTL. The camera optical lens 10 further satisfies the following condition: 0.02≤d15/TTL≤0.12, which is beneficial for realizing the ultra-thin effect. Preferably, the following condition shall be satisfied, 0.03≤d15/TTL≤0.10.

In the present embodiment, an image height of the camera optical lens 10 is defined as IH. The total optical length from the object side surface of the first lens L1 to the image surface Si of the camera optical lens 10 along an optical axis is defined as TTL. The camera optical lens 10 further satisfies the following condition: TTL/IH≤3.14, thereby achieving the ultra-thin performance. Preferably, the following condition shall be satisfied, TTL/IH≤3.05.

In the present embodiment, an F number (FNO) of the camera optical lens 10 is smaller than or equal to 1.86, thereby achieving the large aperture and good imaging performance.

When the above conditions are satisfied, which makes it is possible that the camera optical lens has excellent optical performances, and meanwhile can meet design requirements of large aperture. According the characteristics of the camera optical lens 10, it is particularly suitable for a mobile camera lens component and a WEB camera lens composed of high pixel CCD, CMOS.

The following examples will be used to describe the camera optical lens 10 of the present invention. The symbols recorded in each example will be described as follows. The focal length, on-axis distance, central curvature radius, on-axis thickness, inflexion point position, and arrest point position are all in units of mm.

TTL: the total optical length from the object side surface of the first lens L1 to the image surface Si of the camera optical lens 10 along the optical axis, the unit of TTL is mm.

F number (FNO): a ratio of an effective focal length of the camera optical lens 10 to an entrance pupil diameter (ENPD).

Preferably, inflexion points and/or arrest points can also be arranged on the object side surface and/or image side surface of the lens, so that the demand for high quality imaging can be satisfied, the description below can be referred for specific implementable scheme.

The design information of the camera optical lens 10 in Embodiment 1 of the present invention is shown in the tables 1 and 2.

TABLE 1

|  | R |  | d | nd |  | vd |
|---|---|---|---|---|---|---|
| S1 | ∞ | d0= | −3.980 |  |  |  |
| R1 | −8.382 | d1= | 2.400 | nd1 | 1.5444 v1 | 55.82 |
| R2 | 1.529 | d2= | 1.559 |  |  |  |
| R3 | 2.859 | d3= | 0.510 | nd2 | 1.5444 v2 | 55.82 |
| R4 | −4.579 | d4= | 0.308 |  |  |  |
| R5 | −10.501 | d5= | 0.368 | nd3 | 1.5444 v3 | 55.82 |
| R6 | −0.908 | d6= | 0.035 |  |  |  |
| R7 | −1.720 | d7= | 0.300 | nd4 | 1.5444 v4 | 55.82 |
| R8 | −15.052 | d8= | 0.234 |  |  |  |
| R9 | 8.174 | d9= | 0.400 | nd5 | 1.6610 v5 | 20.53 |
| R10 | 2.726 | d10= | 0.052 |  |  |  |
| R11 | 3.778 | d11= | 0.624 | nd6 | 1.5444 v6 | 55.82 |
| R12 | 7.809 | d12= | 0.050 |  |  |  |
| R13 | 8.896 | d13= | 0.608 | nd7 | 1.5444 v7 | 55.82 |
| R14 | −1.065 | d14= | 0.050 |  |  |  |
| R15 | 4.083 | d15= | 0.300 | nd8 | 1.6449 v8 | 22.54 |
| R16 | 0.912 | d16= | 0.420 |  |  |  |
| R17 | ∞ | d17= | 0.210 | ndg | 1.5168 vg | 64.17 |
| R18 | ∞ | d18= | 0.268 |  |  |  | where, the meaning of the various symbols is as follows.

S1: aperture;

R: curvature radius of an optical surface, a central curvature radius for a lens;

R1: central curvature radius of the object side surface of the first lens L1;

R2: central curvature radius of the image side surface of the first lens L1;

R3: central curvature radius of the object side surface of the second lens L2;

R4: central curvature radius of the image side surface of the second lens L2;

R5: central curvature radius of the object side surface of the third lens L3;

R6: central curvature radius of the image side surface of the third lens L3;

R7: central curvature radius of the object side surface of the fourth lens L4;

R8: central curvature radius of the image side surface of the fourth lens L4;

R9: central curvature radius of the object side surface of the fifth lens L5;

R10: central curvature radius of the image side surface of the fifth lens L5;
R11: central curvature radius of the object side surface of the sixth lens L6;
R12: central curvature radius of the image side surface of the sixth lens L6;
R13: central curvature radius of the object side surface of the seventh lens L7;
R14: central curvature radius of the image side surface of the seventh lens L7;
R15: central curvature radius of the object side surface of the eighth lens L8;
R16: central curvature radius of the image side surface of the eighth lens L8;
R17: central curvature radius of an object side surface of the optical filter GF;
R18: curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L5 to the object side surface of the seventh lens L7;
d13: on-axis thickness of the seventh lens L7;
d14: on-axis distance from the image side surface of the seventh lens L7 to the object side surface of the eighth lens L8;
d15: on-axis thickness of the eighth lens L8;
d16: on-axis distance from the image side surface of the eighth lens L8 to the object side surface of the optical filter GF;
d17: on-axis thickness of the optical filter GF;
d18: on-axis distance from the image side surface of the optical filter GF to the image surface;
nd: refractive index of d line (d-line is green light with a wavelength of 550 nm);
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
nd8: refractive index of d line of the eighth lens L8;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
v8: abbe number of the eighth lens L8;
vg: abbe number of the optical filter GF;

Table 2 shows the aspherical surface data of the camera optical lens 10 in Embodiment 1 of the present invention.

TABLE 2

| | Conic coefficient | Aspheric surface coefficients | | | | |
|---|---|---|---|---|---|---|
| | k | A4 | A6 | A8 | A10 | A12 |
| R1 | −1.1223E+02 | 1.3727E−02 | −2.8951E−03 | 5.2988E−04 | −6.9536E−05 | 6.2282E−06 |
| R2 | 1.3199E−01 | 8.5581E−02 | −1.8321E−02 | −8.0754E−02 | 2.8562E−01 | −3.7410E−01 |
| R3 | −2.9532E+01 | 1.7329E−02 | 1.1468E−01 | −5.9169E+00 | 4.6456E+01 | −2.1938E+02 |
| R4 | 2.9708E+01 | −8.3584E−02 | −6.0414E−01 | 6.6296E+00 | −4.8845E+01 | 2.2414E+02 |
| R5 | 1.7472E+02 | −1.5974E−01 | 6.9020E−01 | −8.3612E+00 | 5.0351E+01 | −1.9556E+02 |
| R6 | −7.2095E+00 | 9.5776E−01 | −9.7230E−01 | 5.8072E+00 | −2.7590E+02 | 9.3549E+02 |
| R7 | −4.6827E+01 | 9.6667E−01 | −6.4692E+00 | 3.0499E+01 | −1.2443E+02 | 3.7236E+02 |
| R8 | 2.2681E+01 | −6.0027E−01 | 1.4660E+00 | −3.3862E+00 | 3.0675E+00 | −2.2552E+00 |
| R9 | 3.6859E+01 | −8.0704E−01 | 1.0402E+00 | −1.6179E+00 | 6.6517E+00 | −2.5884E+01 |
| R10 | 2.6807E+00 | −1.6492E−01 | −6.8665E−01 | 2.7310E+00 | −5.0109E+00 | 5.5293E+00 |
| R11 | 1.4443E+00 | 1.8708E−01 | −1.0255E+00 | 2.0985E+00 | −2.6457E+00 | 2.1573E+00 |
| R12 | −7.6867E+01 | 8.0858E−02 | −1.5143E−01 | −4.7232E−01 | 1.1693E+00 | −1.1509E+00 |
| R13 | 2.5562E+01 | 3.0212E−01 | −4.8857E−01 | 1.3723E−01 | 3.1823E−01 | −4.1725E−01 |
| R14 | −3.4985E+00 | 1.8369E−01 | −1.9596E−01 | 8.5978E−02 | −1.2882E−01 | 2.2601E−01 |
| R15 | −2.0000E+02 | −5.1319E−01 | 3.0502E−01 | 4.0695E−02 | −1.5778E−01 | 1.0559E−01 |
| R16 | −6.3587E+00 | −3.4179E−01 | 3.2955E−01 | −1.8621E−01 | 7.0448E−02 | −1.8351E−02 |
| | Conic coefficient | Aspheric surface coefficients | | | | |
| | k | | A14 | A16 | A18 | A20 |
| R1 | −1.1223E+02 | | −3.6997E−07 | 1.3883E−08 | −2.9739E−10 | 2.7689E−12 |
| R2 | 1.3199E−01 | | 2.4988E−01 | −7.6566E−02 | 2.1562E−03 | 2.3687E−03 |

TABLE 2-continued

| | | | | | |
|---|---|---|---|---|---|
| R3 | −2.9532E+01 | 6.4679E+02 | −1.1686E+03 | 1.1849E+03 | −5.1645E+02 |
| R4 | 2.9708E+01 | −6.3718E+02 | 1.0970E+03 | −1.0478E+03 | 4.2687E+02 |
| R5 | 1.7472E+02 | 4.9300E+02 | −7.6561E+02 | 6.6484E+02 | −2.4316E+02 |
| R6 | −7.2095E+00 | −2.1204E+03 | 3.0396E+03 | −2.4888E+03 | 8.8895E+02 |
| R7 | −4.6827E+01 | −7.5823E+02 | 9.8751E+02 | −7.4106E+02 | 2.4334E+02 |
| R8 | 2.2681E+01 | 7.3203E+00 | −1.5539E+01 | 1.4513E+01 | −5.3975E+00 |
| R9 | 3.6859E+01 | 5.3237E+01 | −5.8573E+01 | 3.3302E+01 | −7.7797E+00 |
| R10 | 2.6807E+00 | −3.8331E+00 | 1.6323E+00 | −3.9055E−01 | 4.0155E−02 |
| R11 | 1.4443E+00 | −1.1296E+00 | 3.6680E−01 | −6.7390E−02 | 5.3744E−03 |
| R12 | −7.6867E+01 | 6.0434E−01 | −1.7113E−01 | 2.2769E−02 | −8.3072E−04 |
| R13 | 2.5562E+01 | 2.5085E−01 | −8.7767E−02 | 1.7292E−02 | −1.4970E−03 |
| R14 | −3.4985E+00 | −1.6959E−01 | 6.1885E−02 | −1.1059E−02 | 7.7916E−04 |
| R15 | −2.0000E+02 | −3.7532E−02 | 7.6837E−03 | −8.5316E−04 | 3.9833E−05 |
| R16 | −6.3587E+00 | 3.2309E−03 | −3.6463E−04 | 2.3670E−05 | −6.6978E−07 |

For convenience, an aspheric surface of each lens surface uses the aspheric surfaces shown in the below condition (1). However, the present invention is not limited to the aspherical polynomials form shown in the condition (1).

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20} \quad (1)$$

Where, K is a conic coefficient, A4, A6, A8, A10, A12, A14, A16, A18, A20 are aspheric surface coefficients. c is the curvature at the center of the optical surface. r is a vertical distance between a point on an aspherical curve and the optic axis, and z is an aspherical depth (a vertical distance between a point on an aspherical surface, having a distance of r from the optic axis, and a surface tangent to a vertex of the aspherical surface on the optic axis).

Table 3 and Table 4 show design data of inflexion points and arrest points of respective lens in the camera optical lens 10 according to Embodiment 1 of the present invention. P1R1 and P1R2 represent the object side surface and the image side surface of the first lens L1, P2R1 and P2R2 represent the object side surface and the image side surface of the second lens L2, P3R1 and P3R2 represent the object side surface and the image side surface of the third lens L3, P4R1 and P4R2 represent the object side surface and the image side surface of the fourth lens L4, P5R1 and P5R2 represent the object side surface and the image side surface of the fifth lens L5, P6R1 and P6R2 represent the object side surface and the image side surface of the sixth lens L6, P7R1 and P7R2 represent the object side surface and the image side surface of the seventh lens L7, and P8R1 and P8R2 represent the object side surface and the image side surface of the eighth lens L8. The data in the column named "inflexion point position" refers to vertical distances from inflexion points arranged on each lens surface to the optical axis of the camera optical lens 10. The data in the column named "arrest point position" refers to vertical distances from arrest points arranged on each lens surface to the optical axis of the camera optical lens 10.

TABLE 3

| | Number of inflexion points | Inflexion point position 1 | Inflexion point position 2 | Inflexion point position 3 | Inflexion point position 4 |
|---|---|---|---|---|---|
| P1R1 | 2 | 0.655 | 4.065 | / | / |
| P1R2 | 1 | 1.235 | / | / | / |
| P2R1 | 1 | 0.405 | / | / | / |
| P2R2 | 1 | 0.735 | / | / | / |
| P3R1 | 1 | 0.675 | / | / | / |
| P3R2 | 1 | 0.705 | / | / | / |
| P4R1 | 2 | 0.225 | 0.345 | / | / |
| P4R2 | 0 | / | / | / | / |

TABLE 3-continued

| | Number of inflexion points | Inflexion point position 1 | Inflexion point position 2 | Inflexion point position 3 | Inflexion point position 4 |
|---|---|---|---|---|---|
| P5R1 | 1 | 0.125 | / | / | / |
| P5R2 | 3 | 0.385 | 0.865 | 1.165 | / |
| P6R1 | 2 | 0.545 | 1.075 | / | / |
| P6R2 | 2 | 0.465 | 1.445 | / | / |
| P7R1 | 1 | 0.665 | / | / | / |
| P7R2 | 3 | 0.975 | 1.375 | 1.575 | / |
| P8R1 | 4 | 0.165 | 1.065 | 1.875 | 2.095 |
| P8R2 | 3 | 0.385 | 1.205 | 1.505 | / |

TABLE 4

| | Number of arrest points | Arrest point position 1 | Arrest point position 2 | Arrest point position 3 |
|---|---|---|---|---|
| P1R1 | 1 | 1.335 | / | / |
| P1R2 | 0 | / | / | / |
| P2R1 | 1 | 0.625 | / | / |
| P2R2 | 0 | / | / | / |
| P3R1 | 0 | / | / | / |
| P3R2 | 0 | / | / | / |
| P4R1 | 0 | / | / | / |
| P4R2 | 0 | / | / | / |
| P5R1 | 1 | 0.205 | / | / |
| P5R2 | 0 | / | / | / |
| P6R1 | 0 | / | / | / |
| P6R2 | 1 | 0.675 | / | / |
| P7R1 | 1 | 1.235 | / | / |
| P7R2 | 0 | / | / | / |
| P8R1 | 3 | 0.305 | 1.745 | 1.955 |
| P8R2 | 1 | 1.885 | / | / |

Figure 2:
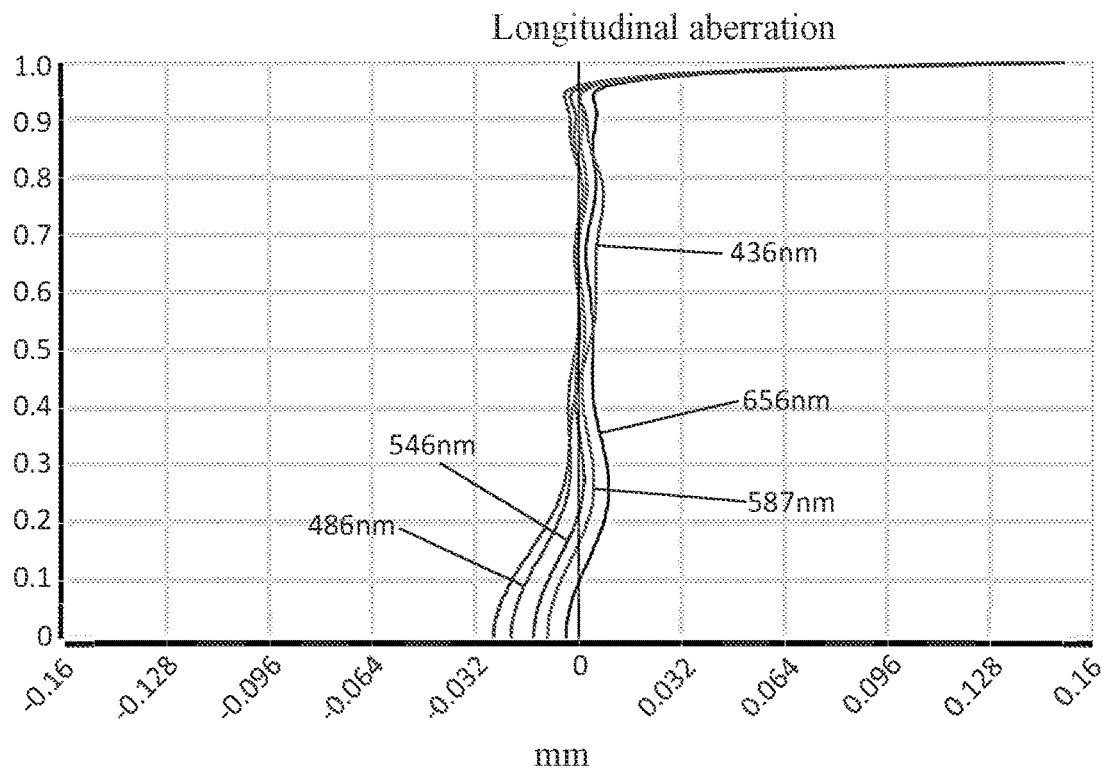
FIG. 2 is a schematic diagram of a longitudinal aberration of the camera optical lens shown in FIG. 1.
Figure 3:
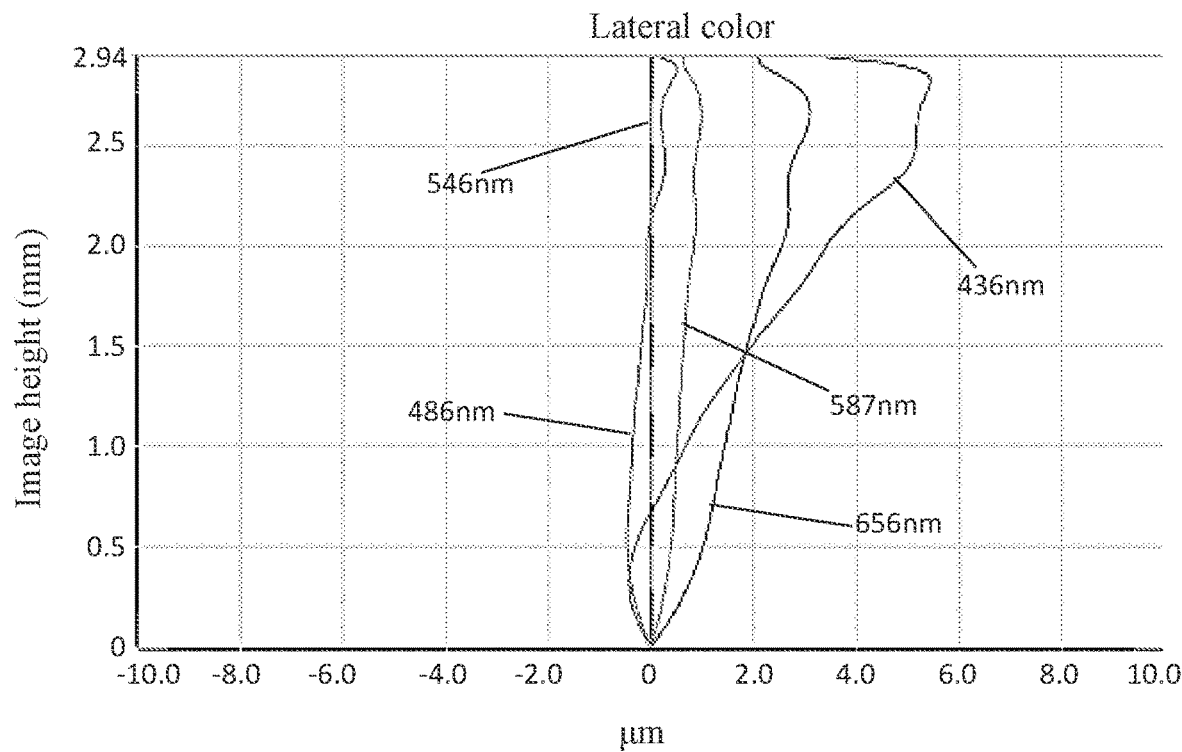
FIG. 3 is a schematic diagram of a lateral color of the camera optical lens shown in FIG. 1.
Figure 4:
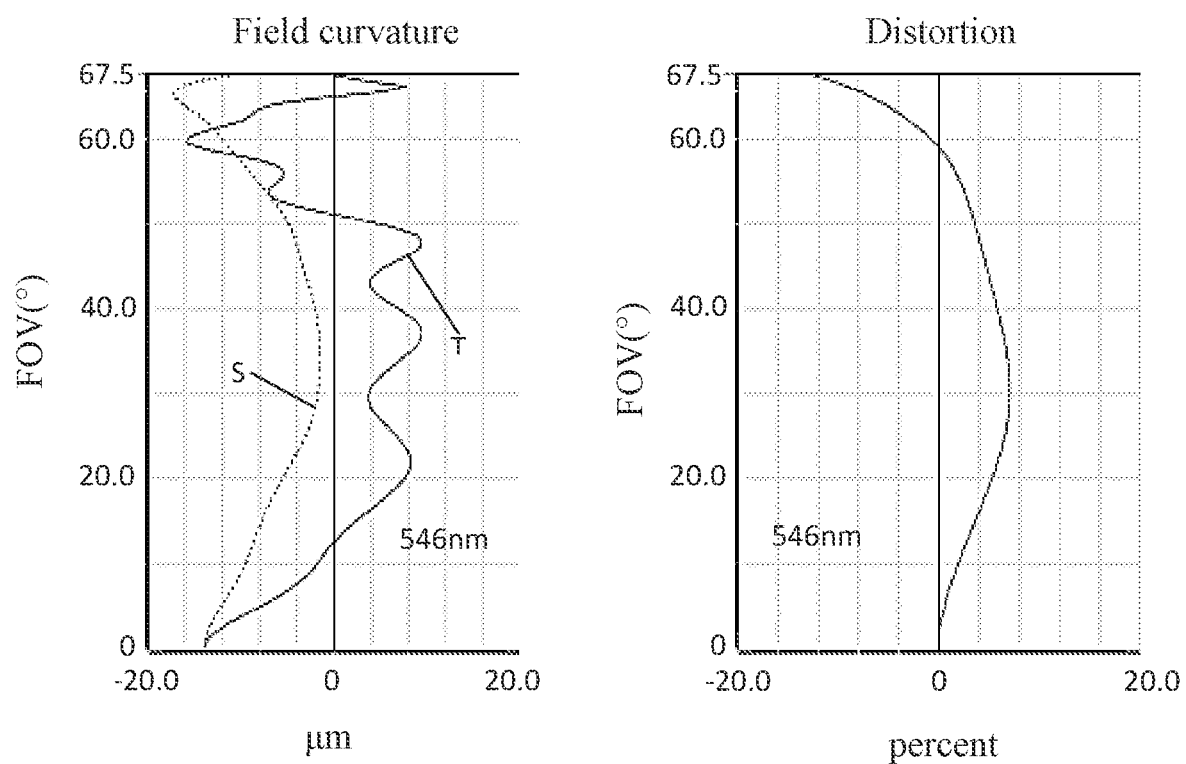
FIG. 4 is a schematic diagram of a field curvature and a distortion of the camera optical lens shown in FIG. 1.

FIG. 2 and FIG. 3 respectively illustrate a longitudinal aberration and a lateral color of light with wavelengths of 656 nm, 587 nm, 546 nm, 486 nm and 436 nm after passing the camera optical lens 10 according to Embodiment 1. FIG. 4 illustrates a field curvature and a distortion of light with a wavelength of 546 nm after passing the camera optical lens 10 according to Embodiment 1, in which a field curvature S is a field curvature in a sagittal direction and T is a field curvature in a tangential direction.

Table 13 shows various values of Embodiments 1, 2 and 3 and values corresponding to parameters which are specified in the above conditions.

As shown in Table 13, Embodiment 1 satisfies the above conditions.

In the present embodiment, the entrance pupil diameter (ENPD) of the camera optical lens 10 is 0.750 mm. The image height of 1.0H is 2.940 mm. The FOV is 135.00°. Thus, the camera optical lens 10 satisfies design requirements of large aperture, ultra-thin and wide-angle while the on-axis and off-axis aberrations are sufficiently corrected, thereby achieving excellent optical characteristics.

Embodiment 2

Embodiment 2 is basically the same as Embodiment 1, the meaning of its symbols is the same as that of Embodiment 1, in the following, only the differences are listed.

A first lens L1 has an object side surface being convex in a paraxial region. A sixth lens L6 has an image side surface being convex in the paraxial region. A third lens L3 has a negative refractive power, and a fourth lens L4 has a positive refractive power.

Figure 5:
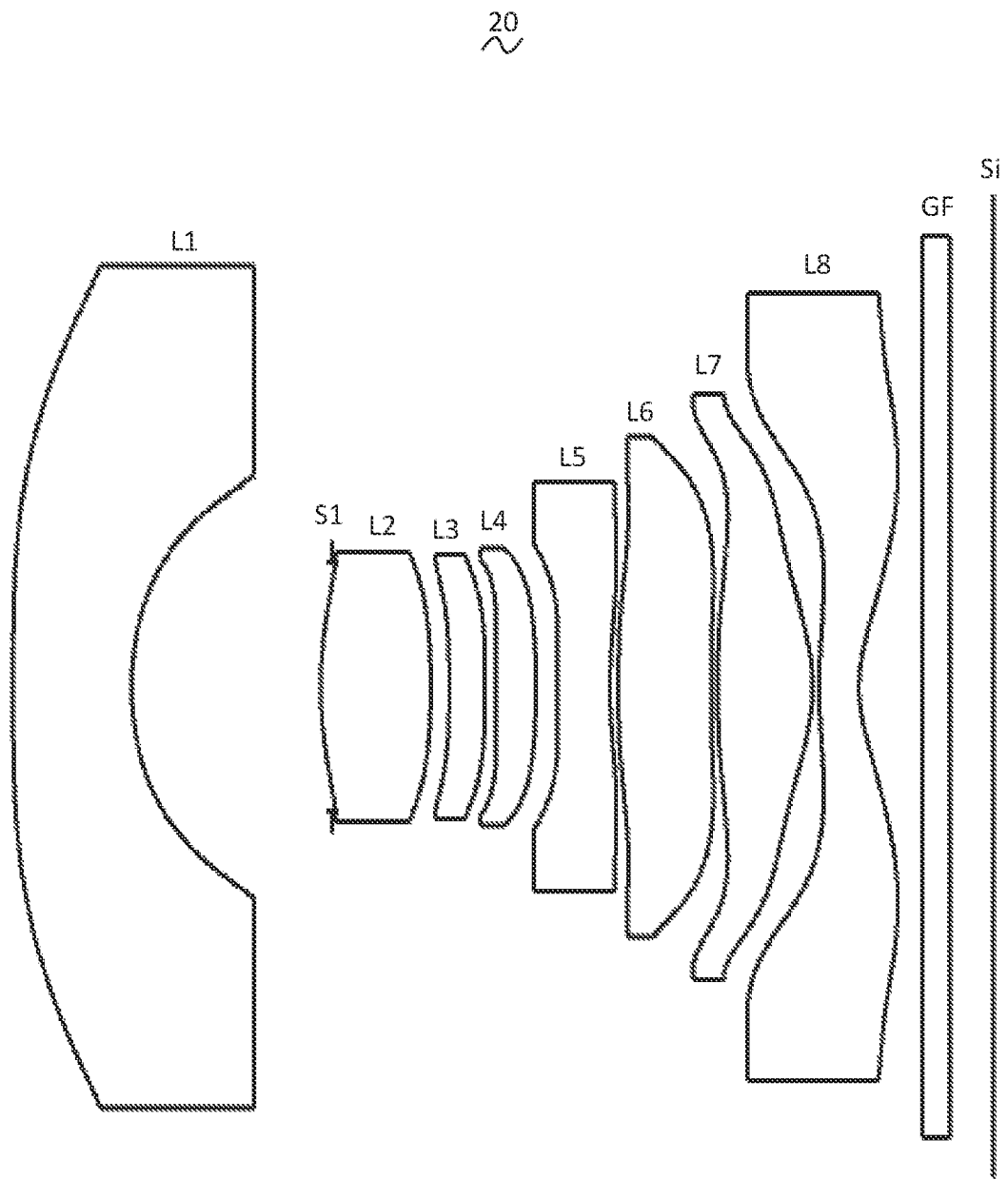
FIG. 5 is a schematic diagram of a structure of a camera optical lens in accordance with Embodiment 2 of the present invention.

FIG. 5 shows a schematic diagram of a structure of a camera optical lens 20 according to Embodiment 2 of the present invention. Table 5 and table 6 show the design data of a camera optical lens 20 in Embodiment 2 of the present invention.

TABLE 5

|  | R | d |  | nd | vd |
|---|---|---|---|---|---|
| S1 | ∞ | d0= | −2.416 | | |
| R1 | 30.620 | d1= | 0.900 | nd1 1.5444 | v1 55.82 |
| R2 | 1.418 | d2= | 1.430 | | |
| R3 | 1.966 | d3= | 0.832 | nd2 1.5444 | v2 55.82 |
| R4 | −3.735 | d4= | 0.139 | | |
| R5 | −6.815 | d5= | 0.270 | nd3 1.5444 | v3 55.82 |
| R6 | −8.130 | d6= | 0.086 | | |
| R7 | −42.194 | d7= | 0.300 | nd4 1.5444 | v4 55.82 |
| R8 | −5.023 | d8= | 0.160 | | |
| R9 | 3.719 | d9= | 0.400 | nd5 1.6610 | v5 20.53 |
| R10 | 2.481 | d10= | 0.063 | | |
| R11 | 13.948 | d11= | 0.704 | nd6 1.5444 | v6 55.82 |
| R12 | −31.490 | d12= | 0.050 | | |
| R13 | 16.94 | d13= | 0.716 | nd7 1.5444 | v7 55.82 |
| R14 | −0.890 | d14= | 0.050 | | |
| R15 | 2.319 | d15= | 0.300 | nd8 1.6449 | v8 22.54 |
| R16 | 0.674 | d16= | 0.478 | | |
| R17 | ∞ | d17= | 0.210 | ndg 1.5168 | vg 64.17 |
| R18 | ∞ | d18= | 0.326 | | |

Table 6 shows aspherical surface data of each lens of the camera optical lens 20 in Embodiment 2 of the present invention.

TABLE 6

| | Conic coefficient | Aspheric surface coefficients | | | | |
|---|---|---|---|---|---|---|
| | k | A4 | A6 | A8 | A10 | A12 |
| R1 | 1.2476E+02 | 4.5895E−02 | −1.6575E−02 | 4.7189E−03 | −6.9761E−04 | −7.2294E−05 |
| R2 | 6.3658E−02 | 7.4145E−02 | 2.6098E−02 | −5.7034E−02 | −7.6695E−02 | 4.6222E−01 |
| R3 | −5.1500E+00 | 2.0371E−02 | 6.7834E−02 | −2.0074E+00 | 1.3421E+01 | −5.5823E+01 |
| R4 | 1.6643E+01 | −1.8700E−01 | 2.3624E−01 | −1.7580E+00 | 1.1938E+01 | −4.7054E+01 |
| R5 | 6.7022E+01 | −3.3920E−01 | 1.9344E−01 | −1.0922E+00 | 1.3220E+01 | −5.8508E+01 |
| R6 | 5.8943E+01 | −1.6814E−01 | −8.8698E−01 | 2.3280E+00 | −1.1521E+01 | 7.0521E+01 |
| R7 | 2.0000E+02 | 9.0424E−02 | 4.0480E−02 | −8.1135E+00 | 4.0052E+01 | −1.2138E+02 |
| R8 | −2.0000E+02 | −7.3627E−01 | 3.5657E+00 | −1.5744E+01 | 4.6033E+01 | −1.0169E+02 |
| R9 | −9.7199E+01 | −7.9653E−01 | 1.5035E+00 | −4.0474E+00 | 8.4740E+00 | −1.4420E+01 |
| R10 | 2.5589E+00 | −2.1447E−01 | −9.3986E−02 | −4.0759E−01 | 2.1359E+00 | −3.6633E+00 |
| R11 | 8.0073E+01 | 5.4389E−01 | −1.6683E+00 | 2.6005E+00 | −2.4472E+00 | 1.3710E+00 |
| R12 | −1.6814E+02 | 6.3165E−01 | −2.2706E+00 | 3.8332E+00 | −4.0752E+00 | 2.8765E+00 |
| R13 | 8.2522E+01 | 5.6571E−01 | −1.7335E+00 | 2.7642E+00 | −2.7588E+00 | 1.7878E+00 |
| R14 | −4.1274E+00 | 2.3690E−01 | −5.0398E−01 | 9.7005E−01 | −1.1636E+00 | 8.3094E−01 |
| R15 | −7.0810E+01 | −4.7021E−02 | −2.4562E−01 | 4.5766E−01 | −4.7881E−01 | 2.8958E−01 |
| R16 | −5.4815E+00 | −1.2165E−01 | 6.5519E−02 | −3.0394E−02 | 8.1727E−03 | −7.8260E−04 |

| | Conic coefficient | Aspheric surface coefficients | | | |
|---|---|---|---|---|---|
| | k | A14 | A16 | A18 | A20 |
| R1 | 1.2476E+02 | 5.6596E−05 | −1.1293E−05 | 1.0473E−06 | −3.8613E−08 |
| R2 | 6.3658E−02 | −7.6650E−01 | 6.2968E−01 | −2.5961E−01 | 4.1898E−02 |
| R3 | −5.1500E+00 | 1.4371E+02 | −2.2578E+02 | 1.9823E+02 | −7.4616E+01 |
| R4 | 1.6643E+01 | 1.1236E+02 | −1.5985E+02 | 1.2483E+02 | −4.0758E+01 |
| R5 | 6.7022E+01 | 1.4566E+02 | −2.1360E+02 | 1.7261E+02 | −5.7609E+01 |
| R6 | 5.8943E+01 | −2.3762E+02 | 4.3597E+02 | −4.1981E+02 | 1.6840E+02 |
| R7 | 2.0000E+02 | 2.4950E+02 | −3.4221E+02 | 2.7971E+02 | −1.0220E+02 |
| R8 | −2.0000E+02 | 1.6652E+02 | −1.8711E+02 | 1.2604E+02 | −3.8104E+01 |
| R9 | −9.7199E+01 | 2.2747E+01 | −2.7934E+01 | 2.0217E+01 | −6.2992E+00 |
| R10 | 2.5589E+00 | 3.4438E+00 | −1.9201E+00 | 5.9786E−01 | −8.0535E−02 |
| R11 | 8.0073E+01 | −4.1401E−01 | 4.1691E−02 | 8.5536E−03 | −1.9130E−03 |
| R12 | −1.6814E+02 | −1.3665E+00 | 4.2349E−01 | −7.7724E−02 | 6.4455E−03 |
| R13 | 8.2522E+01 | −7.5981E−01 | 2.0437E−01 | −3.1362E−02 | 2.0781E−03 |
| R14 | −4.1274E+00 | −3.6473E−01 | 9.6796E−02 | −1.4190E−02 | 8.7831E−04 |
| R15 | −7.0810E+01 | −1.0225E−01 | 2.0954E−02 | −2.3195E−03 | 1.0756E−04 |
| R16 | −5.4815E+00 | −1.0828E−04 | 3.4395E−05 | −3.1768E−06 | 1.0337E−07 |

Table 7 and table 8 show design data of inflexion points and arrest points of respective lens in the camera optical lens 20 according to Embodiment 2 of the present invention.

TABLE 7

| | Number of inflexion points | Inflexion point position1 | Inflexion point position2 | Inflexion point position 3 |
|---|---|---|---|---|
| P1R1 | 1 | 2.345 | / | / |
| P1R2 | 1 | 1.195 | / | / |
| P2R1 | 1 | 0.575 | / | / |
| P2R2 | 0 | / | / | / |
| P3R1 | 1 | 0.665 | / | / |
| P3R2 | 1 | 0.735 | / | / |
| P4R1 | 2 | 0.175 | 0.205 | / |
| P4R2 | 0 | / | / | / |
| P5R1 | 1 | 0.165 | / | / |
| P5R2 | 3 | 0.395 | 0.895 | 1.175 |
| P6R1 | 2 | 0.595 | 1.225 | / |
| P6R2 | 3 | 0.075 | 0.455 | 1.425 |
| P7R1 | 2 | 0.595 | 1.485 | / |
| P7R2 | 3 | 0.565 | 0.935 | 1.515 |
| P8R1 | 2 | 0.335 | 1.415 | / |
| P8R2 | 3 | 0.485 | 1.775 | 2.225 |

TABLE 8

| | Number of arrest points | Number of arrest points 1 | Number of arrest points 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 1 | 0.285 | / |
| P5R2 | 2 | 0.735 | 1.095 |
| P6R1 | 2 | 1.065 | 1.335 |
| P6R2 | 2 | 0.115 | 0.635 |
| P7R1 | 1 | 1.025 | / |
| P7R2 | 0 | / | / |
| P8R1 | 1 | 0.635 | / |
| P8R2 | 1 | 1.295 | / |

Figure 6:
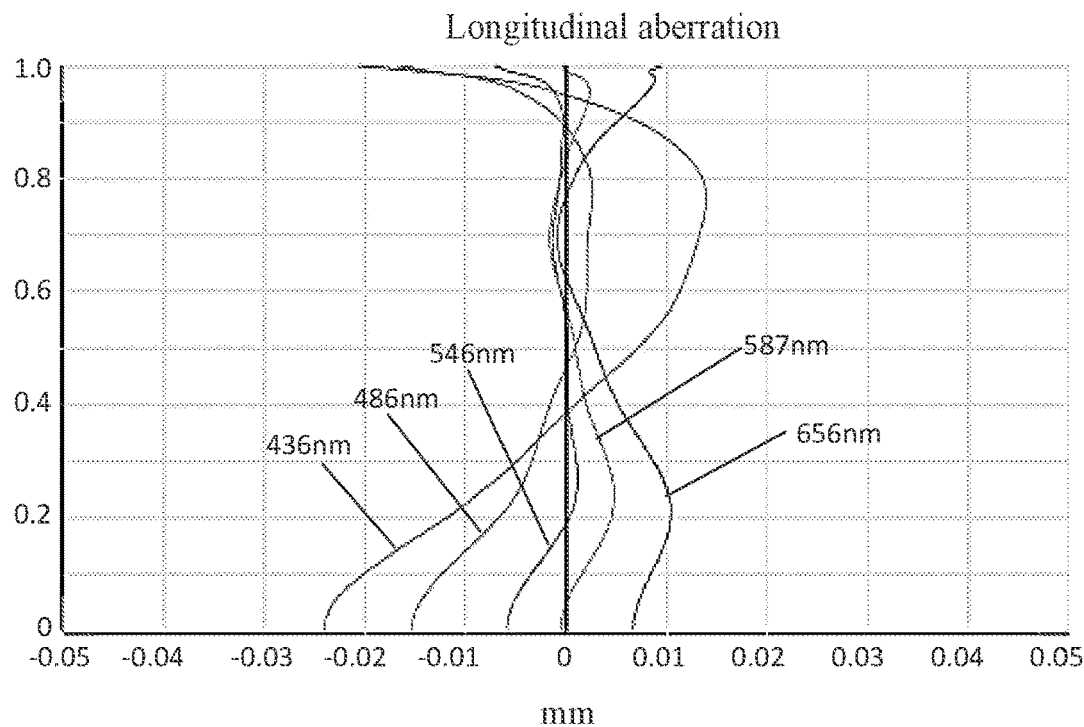
FIG. 6 is a schematic diagram of a longitudinal aberration of the camera optical lens shown in FIG. 5.
Figure 7:
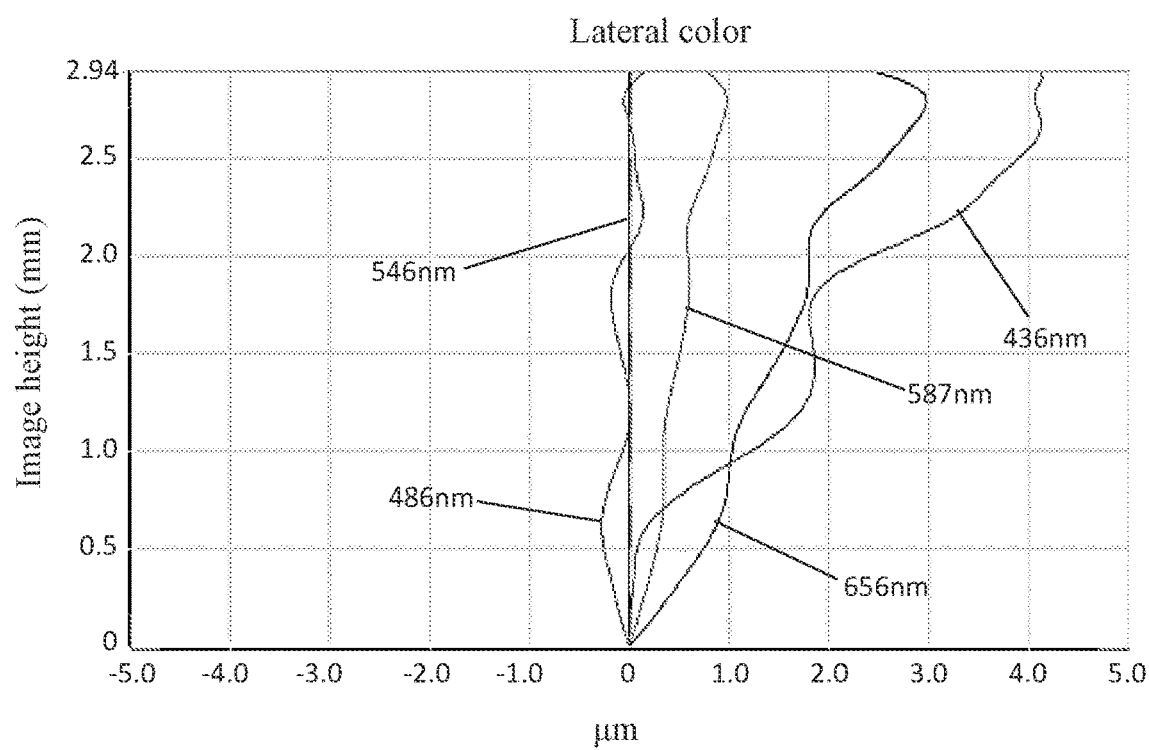
FIG. 7 is a schematic diagram of a lateral color of the camera optical lens shown in FIG. 5.
Figure 8:
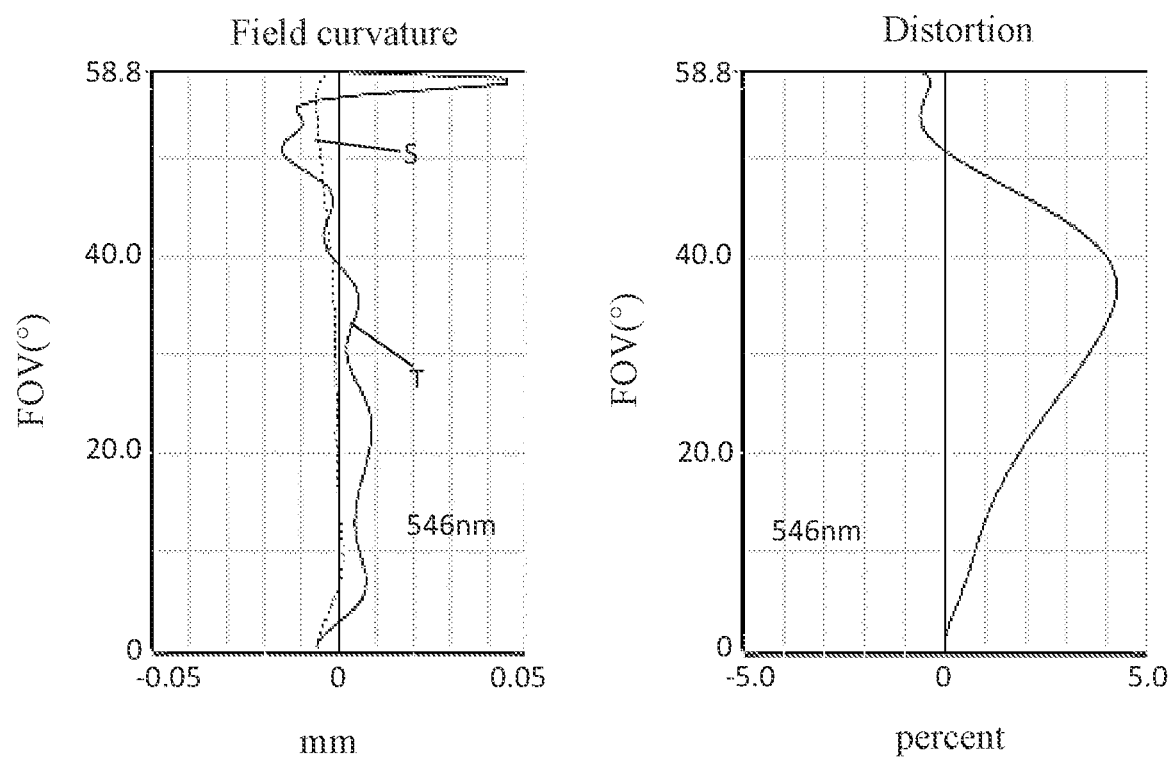
FIG. 8 is a schematic diagram of a field curvature and a distortion of the camera optical lens shown in FIG. 5.

FIG. 6 and FIG. 7 respectively illustrate a longitudinal aberration and a lateral color of light with wavelengths of 656 nm, 587 nm, 546 nm, 486 nm and 436 nm after passing the camera optical lens 20 according to Embodiment 2. FIG. 8 illustrates a field curvature and a distortion of light with a wavelength of 546 nm after passing the camera optical lens 10 according to Embodiment 2, in which a field curvature S is a field curvature in a sagittal direction and T is a field curvature in a tangential direction.

As shown in Table 13, Embodiment 2 satisfies the various conditions.

In the present embodiment, an entrance pupil diameter (ENPD) of the camera optical lens 20 is 0.968 mm. An image height of 1.01 is 2.940 mm. An FOV is 117.60°. Thus, the camera optical lens 20 satisfies design requirements of wide-angle, ultra-thin, and large aperture while on-axis and off-axis aberrations are sufficiently corrected, thereby achieving excellent optical characteristics.

Embodiment 3

Embodiment 3 is basically the same as Embodiment 1 and involves symbols having the same meanings as Embodiment 1, and only differences therebetween will be described in the following.

A first lens L1 has an object side surface being convex in a paraxial region. A second lens L2 has an image side surface being concave in the paraxial region. A seventh lens L7 has an object side surface being concave in the paraxial region.

Figure 9:
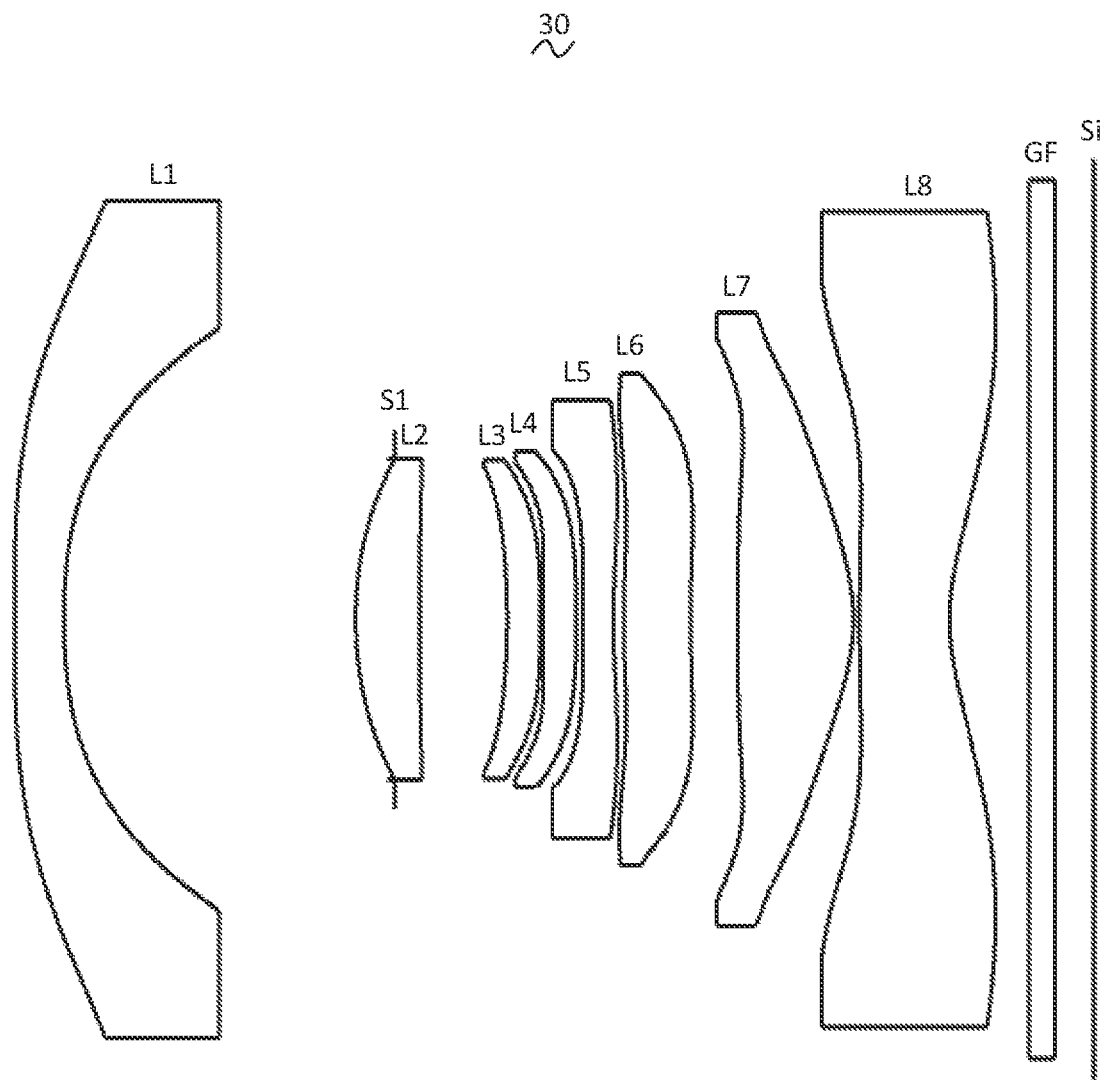
FIG. 9 is a schematic diagram of a structure of a camera optical lens in accordance with Embodiment 3 of the present invention.

FIG. 9 shows a schematic diagram of a structure of a camera optical lens 30 according to Embodiment 3 of the present invention.

Tables 9 and 10 show design data of a camera optical lens 30 in Embodiment 3 of the present invention.

TABLE 9

| | R | d | nd | vd |
|---|---|---|---|---|
| S1 | ∞ | d0= −3.093 | | |
| R1 | 117.245 | d1= 0.403 | nd1 1.5444 | v1 55.82 |
| R2 | 2.905 | d2= 2.375 | | |
| R3 | 1.840 | d3= 0.516 | nd2 1.5444 | v2 55.82 |
| R4 | 23.809 | d4= 0.714 | | |
| R5 | −4.267 | d5= 0.270 | nd3 1.5444 | v3 55.82 |
| R6 | −4.342 | d6= 0.023 | | |
| R7 | −43.267 | d7= 0.270 | nd4 1.5444 | v4 55.82 |
| R8 | −54.495 | d8= 0.051 | | |
| R9 | 4.551 | d9= 0.250 | nd5 1.6610 | v5 20.53 |
| R10 | 3.634 | d10= 0.085 | | |
| R11 | 5.101 | d11= 0.547 | nd6 1.5444 | v6 55.82 |
| R12 | 7.362 | d12= 0.381 | | |
| R13 | −492.053 | d13= 0.940 | nd7 1.5444 | v7 55.82 |
| R14 | −0.981 | d14= 0.050 | | |
| R15 | 21.691 | d15= 0.732 | nd8 1.6449 | v8 22.54 |
| R16 | 1.068 | d16= 0.649 | | |
| R17 | ∞ | d17= 0.210 | ndg 1.5168 | vg 64.17 |
| R18 | ∞ | d18= 0.320 | | |

Table 10 shows aspherical surface data of each lens of the camera optical lens 30 in Embodiment 3 of the present invention.

TABLE 10

| | Conic coefficient | Aspheric surface coefficients | | | | |
|---|---|---|---|---|---|---|
| | k | A4 | A6 | A8 | A10 | A12 |
| R1 | 2.0000E+02 | 6.9466E−02 | −3.1096E−02 | 1.1395E−02 | −3.2052E−03 | 6.5616E−04 |
| R2 | 1.0958E+00 | 8.0288E−02 | −2.2581E−02 | −3.0011E−03 | 1.0231E−02 | −7.0767E−03 |
| R3 | −7.2688E−01 | 1.8802E−02 | 4.5325E−03 | −1.3970E−02 | 8.2106E−02 | −2.1766E−01 |
| R4 | −3.9450E+01 | 2.9530E−03 | −3.1253E−02 | 1.6028E−01 | −4.7974E−01 | 8.8825E−01 |
| R5 | 1.5704E+01 | 1.0659E−03 | −3.3667E−01 | 1.7304E+00 | −5.9073E+00 | 1.3475E+01 |
| R6 | 8.8917E+00 | 4.4731E−01 | −3.6168E+00 | 1.0986E+01 | −2.2957E+01 | 3.6045E+01 |
| R7 | 2.0000E+02 | 4.5462E−01 | −3.1069E+00 | 8.3208E+00 | −1.8376E+01 | 3.3047E+01 |
| R8 | −2.0000E+02 | −8.9210E−01 | 4.3440E+00 | −1.5217E+01 | 3.2825E+01 | −4.5385E+01 |
| R9 | −1.7336E+01 | −9.5017E−01 | 3.6547E+00 | −1.1193E+01 | 2.3377E+01 | −3.2591E+01 |
| R10 | 4.4121E+00 | −2.1936E−01 | 7.9868E−02 | 1.5231E−01 | −2.5655E−01 | 1.0534E−01 |
| R11 | −3.5920E+01 | 6.6312E−03 | −6.2875E−01 | 1.4853E+00 | −1.9021E+00 | 1.5433E+00 |
| R12 | −1.8796E+02 | 3.8814E−02 | −3.1453E−01 | 4.1872E−01 | −3.4913E−01 | 1.9082E−01 |

TABLE 10-continued

| | | | | | |
|---|---|---|---|---|---|
| R13 | 2.0000E+02 | 8.6941E−02 | −3.9146E−02 | −7.7992E−02 | 1.3009E−01 | −9.8168E−02 |
| R14 | −4.7133E+00 | −1.1627E−03 | 7.6255E−02 | −1.3045E−01 | 1.1389E−01 | −5.9595E−02 |
| R15 | 8.4311E+01 | 3.6502E−02 | −1.1163E−01 | 7.5180E−02 | −2.9469E−02 | 7.5674E−03 |
| R16 | −7.1705E+00 | −1.1961E−02 | −1.7544E−02 | 1.3599E−02 | −5.7897E−03 | 1.6290E−03 |

| | Conic coefficient | Aspheric surface coefficients | | | |
|---|---|---|---|---|---|
| | k | A14 | A16 | A18 | A20 |
| R1 | 2.0000E+02 | −9.3576E−05 | 8.7157E−06 | −4.7380E−07 | 1.1364E−08 |
| R2 | 1.0958E+00 | 2.7610E−03 | −6.5167E−04 | 8.6441E−05 | −5.2141E−06 |
| R3 | −7.2688E−01 | 3.2742E−01 | −2.8819E−01 | 1.3816E−01 | −2.8098E−02 |
| R4 | −3.9450E+01 | −1.0291E+00 | 7.1972E−01 | −2.7593E−01 | 4.3885E−02 |
| R5 | 1.5704E+01 | −1.9973E+01 | 1.8465E+01 | −9.6960E+00 | 2.2238E+00 |
| R6 | 8.8917E+00 | −4.1168E+01 | 3.1455E+01 | −1.4140E+01 | 2.8113E+00 |
| R7 | 2.0000E+02 | −4.2200E+01 | 3.4189E+01 | −1.5573E+01 | 3.0338E+00 |
| R8 | −2.0000E+02 | 4.0471E+01 | −2.2616E+01 | 7.2427E+00 | −1.0218E+00 |
| R9 | −1.7336E+01 | 2.9732E+01 | −1.7159E+01 | 5.7294E+00 | −8.5339E−01 |
| R10 | 4.4121E+00 | 5.7055E−02 | −7.0846E−02 | 2.5421E−02 | −3.2494E−03 |
| R11 | −3.5920E+01 | −8.0391E−01 | 2.5953E−01 | −4.7193E−02 | 3.6962E−03 |
| R12 | −1.8796E+02 | −7.1467E−02 | 1.9435E−02 | −3.8035E−03 | 3.9845E−04 |
| R13 | 2.0000E+02 | 4.1798E−02 | −1.0353E−02 | 1.4214E−03 | −8.5604E−05 |
| R14 | −4.7133E+00 | 1.8478E−02 | −3.2374E−03 | 2.8965E−04 | −1.0029E−05 |
| R15 | 8.4311E+01 | −1.2267E−03 | 1.1120E−04 | −3.9801E−06 | −4.3090E−08 |
| R16 | −7.1705E+00 | −3.0211E−04 | 3.5104E−05 | −2.2985E−06 | 6.4408E−08 |

Table 11 and table 12 show Embodiment 3 design data of inflexion points and arrest points of respective lens in the camera optical lens 30 according to Embodiment 3 of the present invention.

TABLE 11

| | Number of inflexion points | Inflexion point position 1 | Inflexion point position 2 | Inflexion point position 3 |
|---|---|---|---|---|
| P1R1 | 1 | 2.365 | / | / |
| P1R2 | 1 | 1.845 | / | / |
| P2R1 | 0 | / | / | / |
| P2R2 | 1 | 0.885 | / | / |
| P3R1 | 0 | / | / | / |
| P3R2 | 1 | 0.985 | / | / |
| P4R1 | 2 | 0.075 | 0.285 | / |
| P4R2 | 0 | / | / | / |
| P5R1 | 1 | 0.155 | / | / |
| P5R2 | 1 | 0.375 | / | / |
| P6R1 | 2 | 0.355 | 1.045 | / |
| P6R2 | 2 | 0.385 | 1.485 | / |
| P7R1 | 2 | 0.045 | 0.845 | / |
| P7R2 | 2 | 1.615 | 1.875 | / |
| P8R1 | 3 | 0.515 | 1.645 | 2.145 |
| P8R2 | 1 | 0.705 | / | / |

TABLE 12

| | Number of arrest points | Arrest point position1 | Arrest point position2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 2 | 0.125 | 0.365 |
| P4R2 | 0 | / | / |
| P5R1 | 1 | 0.295 | / |
| P5R2 | 1 | 0.785 | / |
| P6R1 | 2 | 0.615 | 1.375 |
| P6R2 | 1 | 0.625 | / |
| P7R1 | 2 | 0.075 | 1.135 |
| P7R2 | 0 | / | / |
| P8R1 | 1 | 0.755 | / |
| P8R2 | 1 | 1.895 | / |

Figure 10:
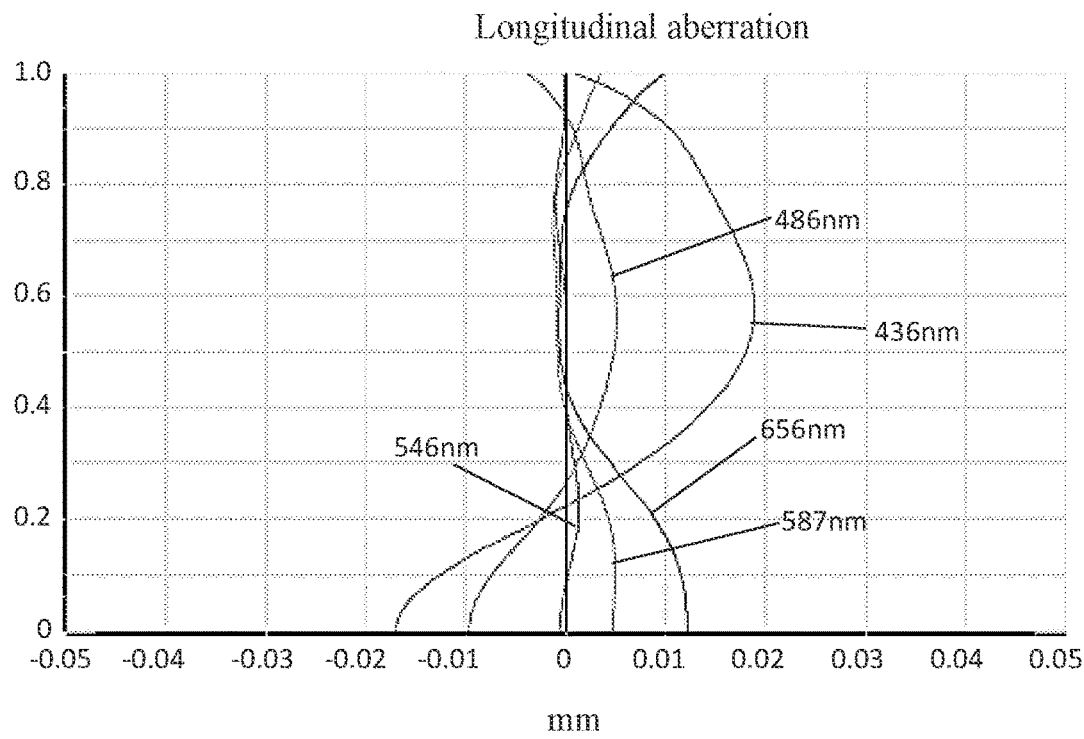
FIG. 10 is a schematic diagram of a longitudinal aberration of the camera optical lens shown in FIG. 9.
Figure 11:
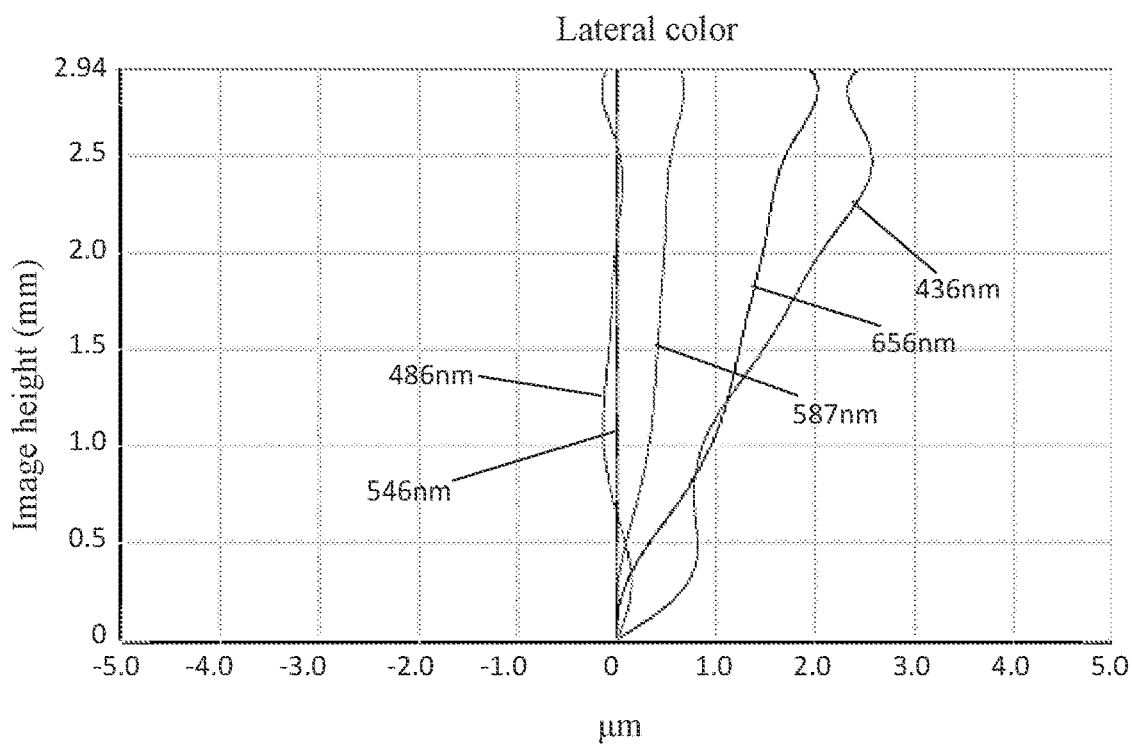
FIG. 11 is a schematic diagram of a lateral color of the camera optical lens shown in FIG. 9.
Figure 12:
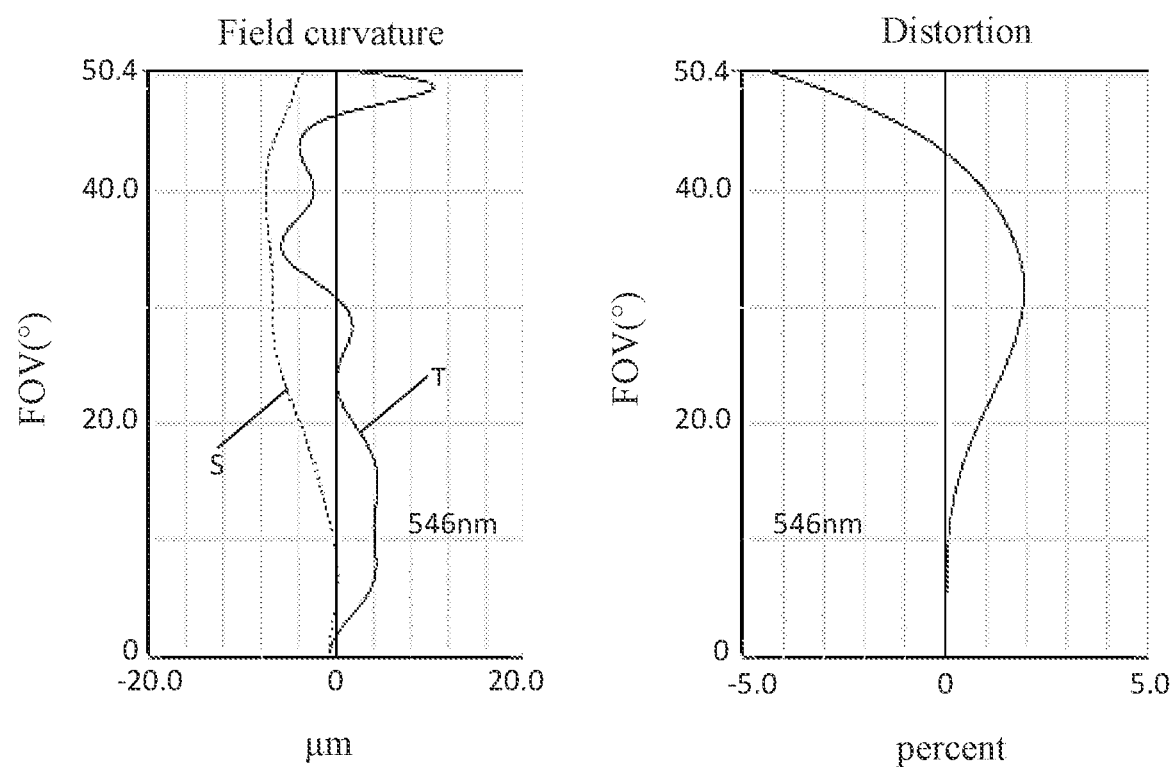
FIG. 12 is a schematic diagram of a field curvature and a distortion of the camera optical lens shown in FIG. 9.

FIG. 10 and FIG. 11 respectively illustrate a longitudinal aberration and a lateral color of light with wavelengths of 656 nm, 587 nm, 546 nm, 486 nm and 436 nm after passing the camera optical lens 30 according to Embodiment 3. FIG. 12 illustrates a field curvature and a distortion of light with a wavelength of 546 nm after passing the camera optical lens 30 according to Embodiment 3, in which a field curvature S is a field curvature in a sagittal direction and T is a field curvature in a tangential direction.

Table 13 in the following lists values corresponding to the respective conditions. In the present Embodiment 3 in order to satisfy the above conditions.

In the present embodiment, an entrance pupil diameter (ENPD) of the camera optical lens 30 is 1.374 mm. An image height of 1.0H is 2.940 mm. An FOV is 100.80°. Thus, the camera optical lens 30 satisfies design requirements of wide-angle while on-axis and off-axis aberrations are sufficiently corrected, thereby achieving excellent optical characteristics.

TABLE 13

| Parameters and conditions | Embodiment 1 | Embodiment 2 | Embodiment 3 |
|---|---|---|---|
| FOV | 135.00° | 117.60° | 100.80° |
| f3/f4 | −0.50 | −7.99 | −4.25 |
| d8/d10 | 4.50 | 2.54 | 0.60 |
| f | 1.388 | 1.790 | 2.542 |
| f1 | −2.178 | −2.750 | −5.455 |
| f2 | 3.299 | 2.484 | 3.617 |
| f3 | 1.794 | −83.087 | 1648.253 |
| f4 | −3.580 | 10.399 | −387.388 |
| f5 | −6.304 | −12.808 | −30.293 |
| f6 | 12.689 | 17.778 | 27.987 |
| f7 | 1.778 | 1.568 | 1.797 |

TABLE 13-continued

| Parameters and conditions | Embodiment 1 | Embodiment 2 | Embodiment 3 |
|---|---|---|---|
| f8 | −1.873 | −1.573 | −1.749 |
| FNO | 1.85 | 1.85 | 1.85 |
| TTL | 8.696 | 7.414 | 8.786 |
| IH | 2.940 | 2.940 | 2.940 |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera optical lens, comprising, from an object side to an image side in sequence: a first lens having a negative refractive power, a second lens, a third lens, a fourth lens, a fifth lens, a sixth lens, a seventh lens, and an eighth lens; the first lens has an image side surface being concave in a paraxial region; wherein the camera optical lens satisfies the following conditions:

$100.00° \leq FOV \leq 135.00°;$ $-8.00 \leq f3/f4 \leq -0.50;$ $0.60 \leq d8/d10 \leq 4.50;$ $-4.29 \leq f1/f \leq -1.02;$ $0.35 \leq (R1+R2)/(R1-R2) \leq 1.65;$ and $0.02 \leq d1/TTL \leq 0.41;$ where, FOV: a field of view of the camera optical lens in a diagonal direction;
f3: a focal length of the third lens;
f4: a focal length of the fourth lens;
d8: an on-axis distance from an image side surface of the fourth lens to an object side surface of the fifth lens;
d10: an on-axis distance from an image side surface of the fifth lens to an object side surface of the sixth lens;
f1: a focal length of the first lens;
f: a focal length of the camera optical lens;
R1: a central curvature radius of the object side surface of the first lens;
R2: a central curvature radius of the image side surface of the first lens;
d1: an on-axis thickness of the first lens; and
TTL: a total optical length from an object side surface of the first lens of the camera optical lens to an image surface of the camera optical lens along an optical axis.

2. The camera optical lens according to claim 1, wherein, the camera optical lens satisfies the following condition:

$2.00 \leq (R9+R10)/(R9-R10) \leq 9.00;$ where,
R9: a central curvature radius of the object side surface of the fifth lens; and
R10: a central curvature radius of the image side surface of the fifth lens.

3. The camera optical lens according to claim 1 further satisfying the following conditions:

$-2.68 \leq f1/f \leq -1.28;$ $0.55 \leq (R1+R2)/(R1-R2) \leq 1.32;$ and $0.04 \leq d1/TTL \leq 0.33.$ 4. The camera optical lens according to claim 1, wherein, the second lens has an object side surface being convex in a paraxial region; the second lens has a positive refractive power; the camera optical lens further satisfies the following conditions:

$0.69 \leq f2/f \leq 3.57;$ $-2.34 \leq (R3+R4)/(R3-R4) \leq -0.15;$ and $0.03 \leq d3/TTL \leq 0.17;$ where,
f: a focal length of the optical camera lens;
f2: a focal length of the second lens;
R3: a central curvature radius of the object side surface of the second lens;
R4: a central curvature radius of an image side surface of the second lens;
d3: an on-axis thickness of the second lens; and
TTL: a total optical length from an object side surface of the first lens of the camera optical lens to an image surface of the camera optical lens along an optical axis.

5. The camera optical lens according to claim 4 further satisfying the following conditions:

$1.11 \leq f2/f \leq 2.85;$ $-1.46 \leq (R3+R4)/(R3-R4) \leq -0.19;$ and $0.05 \leq d3/TTL \leq 0.13.$ 6. The camera optical lens according to claim 1, wherein, the third lens has an object side surface being concave in a paraxial region, and an image side surface being convex in the paraxial region;

the camera optical lens further satisfies the following conditions:

$-92.83 \leq f3/f \leq 972.61;$ $-229.57 \leq (R5+R6)/(R5-R6) \leq 1.78;$ and $0.02 \leq d5/TTL \leq 0.06;$ where,
f: a focal length of the optical camera lens;
R5: a central curvature radius of the object side surface of the third lens;
R6: a central curvature radius of the image side surface of the third lens;
d5: an on-axis thickness of the third lens; and
TTL: a total optical length from an object side surface of the first lens of the camera optical lens to an image surface of the camera optical lens along an optical axis.

7. The camera optical lens according to claim 6 further satisfying the following conditions:

$-58.02 \leq f3/f \leq 778.09;$ $-143.48 \leq (R5+R6)/(R5-R6) \leq 1.43;$ and $0.02 \leq d5/TTL \leq 0.05.$ 8. The camera optical lens according to claim 1, wherein, the fourth lens has an object side surface being concave in a paraxial region, the image side surface of the fourth lens is convex in the paraxial region;

the camera optical lens further satisfies the following conditions:

$-304.79 \leq f4/f \leq 8.71$;

$-17.41 \leq (R7+R8)/(R7-R8) \leq 1.91$; and $0.02 \leq d7/TTL \leq 0.06$;

where,
f: a focal length of the optical camera lens;
R7: a central curvature radius of the object side surface of the fourth lens;
R8: a central curvature radius of the image side surface of the fourth lens;
d7: an on-axis thickness of the fourth lens; and
TTL: a total optical length from an object side surface of the first lens of the camera optical lens to an image surface of the camera optical lens along an optical axis.

9. The camera optical lens according to claim 8 further satisfying the following conditions:

$-190.49 \leq f4/f \leq 6.97$;

$-10.88 \leq (R7+R8)/(R7-R8) \leq 1.52$; and $0.02 \leq d7/TTL \leq 0.05$.

10. The camera optical lens according to claim 1, wherein, the object side surface of the fifth lens is convex in a paraxial region and the image side surface of the fifth lens is concave in the paraxial region;
the fifth lens has a negative refractive power;
the camera optical lens further satisfies the following conditions:

$-23.83 \leq f5/f \leq -3.03$; and $0.01 \leq d9/TTL \leq 0.08$;

where,
f: a focal length of the camera optical lens;
f5: a focal length of the fifth lens;
d9: an on-axis thickness of the fifth lens; and
TTL: a total optical length from an object side surface of the first lens of the camera optical lens to an image surface of the camera optical lens along an optical axis.

11. The camera optical lens according to claim 10 further satisfying the following conditions:

$-14.90 \leq f5/f \leq -3.78$; and $0.02 \leq d9/TTL \leq 0.06$.

12. The camera optical lens according to claim 1, wherein, the object side surface of the sixth lens is convex in a paraxial region; the sixth lens has a positive refractive power; the camera optical lens further satisfies the following conditions:

$4.57 \leq f6/f \leq 16.51$;

$-11.02 \leq (R11+R12)/(R11-R12) \leq -0.26$; and $0.03 \leq d11/TTL \leq 0.14$;

where,
f: a focal length of the camera optical lens;
f6: a focal length of the sixth lens;
R11: a central curvature radius of the object side surface of the sixth lens;
R12: a central curvature radius of an image side surface of the sixth lens;
d11: an on-axis thickness of the sixth lens; and
TTL: a total optical length from an object side surface of the first lens of the camera optical lens to an image surface of the camera optical lens along an optical axis.

13. The camera optical lens according to claim 12 further satisfying the following conditions:

$7.31 \leq f6/f \leq 13.21$;

$-6.89 \leq (R11+R12)/(R11-R12) \leq -0.32$; and $0.05 \leq d11/TTL \leq 0.11$.

14. The camera optical lens according to claim 1, wherein, the seventh lens has an image side surface being convex in a paraxial region;
the seventh lens has a positive refractive power;
the camera optical lens further satisfies the following conditions:

$0.35 \leq f7/f \leq 1.92$;

$0.39 \leq (R13+R14)/(R13-R14) \leq 1.51$; and $0.03 \leq d13/TTL \leq 0.16$;

where,
f: a focal length of the camera optical lens;
f7: a focal length of the seventh lens;
R13: a central curvature radius of an object side surface of the seventh lens;
R14: a central curvature radius of the image side surface of the seventh lens;
d13: an on-axis thickness of the seventh lens; and
TTL: a total optical length from an object side surface of the first lens of the camera optical lens to an image surface of the camera optical lens along an optical axis.

15. The camera optical lens according to claim 14 further satisfying the following conditions:

$0.57 \leq f7/f \leq 1.54$;

$0.63 \leq (R13+R14)/(R13-R14) \leq 1.20$; and $0.06 \leq d13/TTL \leq 0.13$.

16. The camera optical lens according to claim 1, wherein, the eighth lens has an object side surface being convex in a paraxial region and an image side surface being concave in the paraxial region;
the eighth lens has a negative refractive power;
the camera optical lens further satisfies the following conditions:

$-2.70 \leq f8/f \leq -0.46$;

$0.55 \leq (R15+R16)/(R15-R16) \leq 2.73$; and $0.02 \leq d15/TTL \leq 0.12$;

where,
f: a focal length of the camera optical lens;
f8: a focal length of the eighth lens;
R15: a central curvature radius of the object side surface of the eighth lens;
R16: a central curvature radius of the image side surface of the eighth lens;
d15: an on-axis thickness of the eighth lens; and
TTL: a total optical length from an object side surface of the first lens of the camera optical lens to an image surface of the camera optical lens along an optical axis.

17. The camera optical lens according to claim 16 further satisfying the following conditions:

$-1.69 \leq f8/f \leq -0.57;$ $0.88 \leq (R15+R16)/(R15-R16) \leq 2.18;$ and $0.03 \leq d15/TTL \leq 0.10.$

18. The camera optical lens according to claim 1 further satisfying the following condition: $TTL/IH \leq 3.14;$
where,
IH: an image height of the camera optical lens; and
TTL: a total optical length from an object side surface of the first lens of the camera optical lens to an image surface of the camera optical lens along an optical axis.

19. The camera optical lens according to claim 1, wherein, an FNO of the camera optical lens is less than or equal to 1.86;
where,
FNO: a ratio of an effective focal length of the camera optical lens to an entrance pupil diameter.

* * * * *